US012469355B2

(12) United States Patent
Edwards

(10) Patent No.: US 12,469,355 B2

(45) Date of Patent: Nov. 11, 2025

(54) AUTOMATED KIOSK AND ASSOCIATED METHOD TO DISPENSE A FILLED CONTAINER

(71) Applicant: Drop Water Corporation, San Luis Obispo, CA (US)

(72) Inventor: Scott Paul Edwards, Menlo Park, CA (US)

(73) Assignee: Drop Water Corporation, San Louis Obispo, CA (US)

( * ) Notice: Subject to any disclaimer, the term of this patent is extended or adjusted under 35 U.S.C. 154(b) by 0 days.

(21) Appl. No.: 18/228,887

(22) Filed: Aug. 1, 2023

(65) Prior Publication Data

US 2023/0377406 A1 Nov. 23, 2023

Related U.S. Application Data

(63) Continuation of application No. 16/731,903, filed on Dec. 31, 2019, now Pat. No. 11,741,775, which is a (Continued)

(51) Int. Cl.
*B65B 3/00* (2006.01)
*B65B 3/02* (2006.01)
(Continued)

(52) U.S. Cl.
CPC .............. *G07F 13/065* (2013.01); *B65B 3/00* (2013.01); *B65B 3/02* (2013.01); *B65B 3/045* (2013.01); *B65B 7/16* (2013.01); *B65B 7/2835* (2013.01); *B67B 7/182* (2013.01); *G07F 9/105* (2013.01); *G07F 13/10* (2013.01); *C02F 1/283* (2013.01);

(Continued)

(58) Field of Classification Search
CPC .... B65B 3/00; B65B 3/02; B65B 3/04; B65B 3/045; B65B 7/16; B65B 7/28; B65B 7/2835; B65B 43/14; B65B 43/42; B65B 43/44; B65B 61/202; G07F 13/065;
(Continued)

(56) References Cited

U.S. PATENT DOCUMENTS 3,533,211 A * 10/1970 Einnehmer ............. G07F 13/10 53/471
3,640,430 A * 2/1972 Roberts ................... G07F 13/00 222/1

(Continued)

FOREIGN PATENT DOCUMENTS

WO WO-2005097664 A1 * 10/2005 ............... B67B 3/10
WO WO-2015053837 A2 * 4/2015 ............. G07F 13/10

*Primary Examiner* — Stephen F. Gerrity
(74) *Attorney, Agent, or Firm* — Vedder Price P.C.

(57) ABSTRACT

In one embodiment, a method for dispensing a filled container comprises removing a single container from a stack of containers within a chassis, filling the single container with filtered water within the chassis, sealing the single container within the chassis, and dispensing the single container from the chassis. In another embodiment, a system for dispensing a filled container comprises a chassis, a stack of containers within the chassis, and an automated mechanism within the chassis to remove a single container from the stack of containers, fill the single container with filtered water, seal the single container, and dispense the single container from the chassis.

20 Claims, 39 Drawing Sheets

Related U.S. Application Data continuation of application No. 15/812,431, filed on Nov. 14, 2017, now Pat. No. 10,540,840, which is a continuation-in-part of application No. 14/242,295, filed on Apr. 1, 2014, now abandoned.

(60) Provisional application No. 61/807,191, filed on Apr. 1, 2013.

(51) Int. Cl.

| | |
|---|---|
| ***B65B 3/04*** | (2006.01) |
| ***B65B 7/16*** | (2006.01) |
| ***B65B 7/28*** | (2006.01) |
| ***B67B 7/18*** | (2006.01) |
| ***G07F 9/10*** | (2006.01) |
| ***G07F 13/06*** | (2006.01) |
| ***G07F 13/10*** | (2006.01) |
| *C02F 1/28* | (2023.01) |
| *C02F 1/32* | (2023.01) |
| *C02F 1/44* | (2023.01) |

(52) U.S. Cl.

CPC ................ *C02F 1/32* (2013.01); *C02F 1/441* (2013.01); *C02F 2209/008* (2013.01); *C02F 2307/10* (2013.01)

(58) Field of Classification Search

CPC ..... G07F 13/10; B67B 7/182; B65D 21/0233; B65D 77/065

USPC .................................. 53/457, 468, 281, 282

See application file for complete search history.

(56) References Cited

U.S. PATENT DOCUMENTS

| | | | | | |
|---|---|---|---|---|---|
| 4,510,737 | A * | 4/1985 | Ellert | B65B 61/28 | 53/570 |
| 4,815,256 | A * | 3/1989 | Brown et al. | G07F 13/10 | 53/469 |
| 4,911,212 | A * | 3/1990 | Burton | G07F 13/025 | 141/90 |
| 8,126,589 | B1 * | 2/2012 | Parker | G07F 13/10 | 221/96 |
| 2004/0026452 | A1 * | 2/2004 | Santiago et al. | G07F 13/065 | 62/392 |
| 2004/0031535 | A1 * | 2/2004 | Russell et al. | B65B 3/045 | 141/10 |
| 2008/0041018 | A1 * | 2/2008 | Stephenson | B65D 77/065 | 53/449 |
| 2008/0052094 | A1 * | 2/2008 | Morfopoulos et al. | G07F 13/025 | 210/182 |
| 2009/0057347 | A1 * | 3/2009 | Leys et al. | B65D 83/771 | 222/105 |
| 2009/0202687 | A1 * | 8/2009 | Griego et al. | B65D 71/50 | 99/290 |
| 2010/0084048 | A1 * | 4/2010 | Chen | G07F 13/10 | 141/129 |
| 2010/0084361 | A1 * | 4/2010 | Dayton et al. | B65D 65/466 | 493/93 |
| 2013/0233912 | A1 * | 9/2013 | Piotrowski | B65D 77/065 | 53/449 |

* cited by examiner 21
22
28

24

25
25

26
View of main
portion of cap
from above

27

AUTOMATED KIOSK AND ASSOCIATED METHOD TO DISPENSE A FILLED CONTAINER

PRIORITY CLAIM

This application is a continuation of U.S. patent application Ser. No. 16/731,903, filed on Dec. 31, 2019, titled, "Automated Electromechanical Gripper for Handling a Container," and issued as U.S. Pat. No. 11,741,775, which is a continuation of U.S. patent application Ser. No. 15/812,431, filed on Nov. 14, 2017, titled "Automated Liquid Dispensing Device and Associated Method," and issued as U.S. Pat. No. 10,540,840, which is a continuation-in-part of U.S. patent application Ser. No. 14/242,295, filed on Apr. 1, 2014 and titled, "System and Method for Eco-Friendly Beverage Dispensing Kiosk," which claims priority to U.S. Provisional Application No. 61/807,191, filed on Apr. 1, 2013 and titled, "Automated closed loop system for sterilizing and refilling bottles for drinking water," all of which are incorporated by reference herein.

TECHNICAL FIELD

The present invention is system and method for dispensing a filled container from a chassis.

BACKGROUND OF THE INVENTION

Traditional containers for liquids, such as beverages, detergents, soaps, oils, and other liquids, are inefficient and wasteful because of the amount of plastic and other packaging used to contain that liquid during the distribution cycle. One of the most common uses for such a container is for bottled water, even though water is ubiquitous and safe to drink in many places, communities still prefer to drink water in harmful plastic containers for its convenience. Most consumers do not recycle these plastic containers. A typical prior art container is manufactured using injection blow molding and utilizes a screw cap closure out of PET (polyethylene terephthalate) and HDPE (high-density polyethylene). This packaging will be excessively hard to be broken down by nature which has caused massive amounts of plastic waste to accumulate in waterways, as observed by the NOAA. It is well-known that disposable plastic bottles and other containers being consumed on a global scale have caused massive ecological damage due to the consumption of fossil fuels to both package and transport beverages from the bottling plant to the consumer.

Currently humanity is fixed operating within an industry which requires packaging to have a long shelf life, and be strong enough to survive a distribution channel. The prior art lacks a solution for providing a beverage container that is able to be processed by nature and that meets various state, national, and international standards for "compostability."

What is needed is an automated liquid dispensing device that can store a plurality of empty, compostable containers and can fill a single container, seal it, and dispense the filled container to a user on demand. Such an automated liquid dispensing device would overcome the prior art need for the packaging to be designed for a long shelf life and usage of a violent distribution channel, enabling the use of environmentally friendly materials in the container.

SUMMARY OF THE INVENTION

Examples of liquid dispensing devices and associated methods are disclosed herein. The liquid dispensing devices comprise novel mechanisms for removing a single container from a nested stack of containers, closing the bottom of the container, decapping the container, filling the container, capping the container, and dispensing the filled container to a user.

The above-described problems with producing compostable bottled water or beverage are alleviated by using the liquid dispensing devices herein. The devices use the municipal water supply, filter the water, provide additives in accordance with consumer preferences, fill compostable bottles stored in the chassis, and deliver a sealed, filled bottle to the consumer.

In the described embodiments, the beverage container comprises an external shell, internal pouch, and closure. Its shape is unique and different than a prior art beverage bottle. The shell may be of an easily degradable material such as wood or bamboo pulp. Unlike other carton-like containers, the liquid is stored in a thin film pouch within the shell. The pouch may consist of poly-lactic acid (PLA) or polyhydroxyalkanoates (PHA) or polybutyrate (PBAT) in such thickness and of such type that it meets regulatory requirements to be certified as "compostable." The cap may be a typical cap with threads to screw onto the top of the container or an alternative. The cap may be made of wood, bio-polymer, or another material. To meet regulatory requirements, the entire container, may be certified as "compostable" by certification organization Vincotte (Brussels, Belgium) or a similar entity.

The shell optionally comprises a conical tube with a narrower opening on top and a bottom that is wider, which has a hinged flap that is able to either leave a large opening on the bottom or is able to close the large opening by being folded into it. During transpiration, the large opening on the bottom is left open so bottles may be nested together. The point of sale may be a beverage kiosk or other point of retail sale. Because the hinged bottom is in the open position at the time of shipping, the containers may be stacked efficiently, with many hundreds or thousands of containers able to be stacked and stored within a space within a kiosk housing that is smaller than the size of a typical vending machine, and allowing for other equipment inside the housing.

A data collection interface is employed to interface with the meter data collection system. A number of software applications for cleaning, validating and estimating data are employed. A message bus transfers data or information derived from the data between the data collection system, the data collection interface and the software applications. By employing a number of different software applications to perform the functions of cleaning, validating and estimating data, where the software applications communicate with one another and with the data collection interface through the message bus, efficiency and flexibility of the cleaning, validating and estimating functions performed by the software applications are improved.

When a consumer purchases a beverage using the liquid dispensing devices described herein, the container is filled and delivered to the consumer. In this document, the terms "purchaser," "consumer," "user," and "beverage recipient" are used interchangeably.

BRIEF DESCRIPTION OF THE DRAWINGS

FIGS. 25A, 25B, and 25C depict a top view of capper/decapper and sensors used to sense the presence of a cap.

DETAILED DESCRIPTION OF THE PREFERRED EMBODIMENTS

Liquid Dispensing Device

Figure 1:
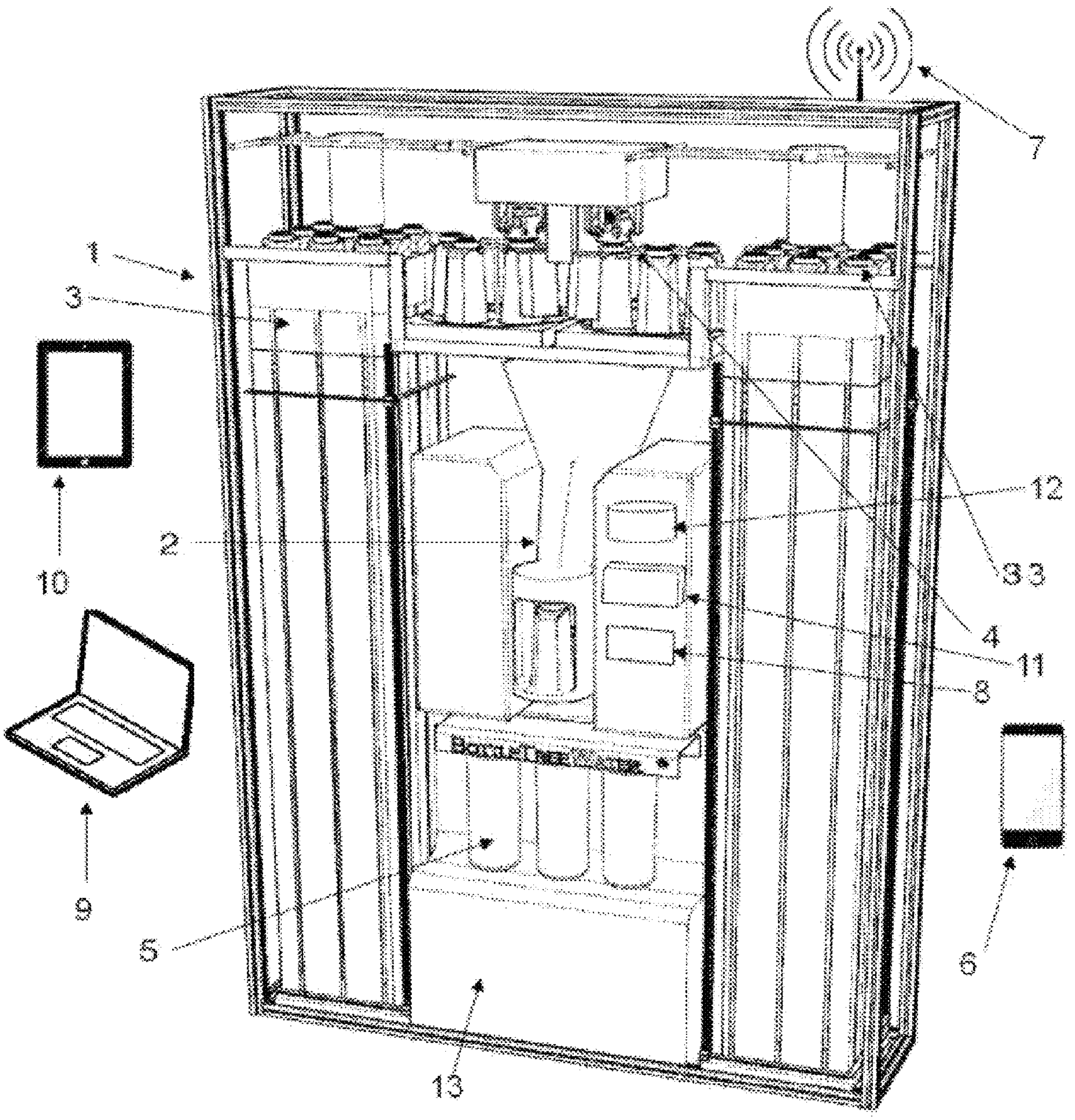
FIG. 1 is a diagram of a first embodiment of a liquid dispensing device.
Figure 2:
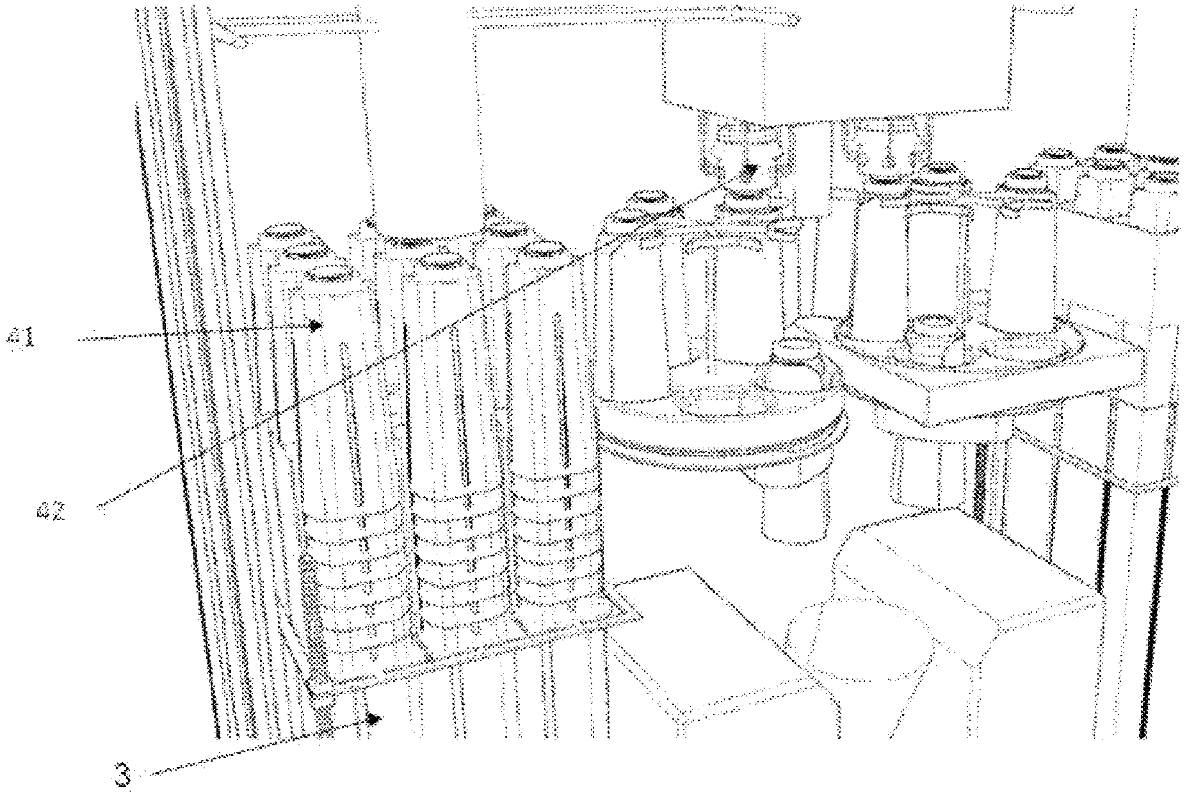
FIG. 2 is a diagram showing details of bottle storage and the filling mechanism of FIG. 1.

FIG. 1 is a block diagram illustrating one embodiment of the invention. As shown in FIG. 1, the kiosk 1 contains the elements necessary to produce and deliver bottled water or other beverages to the purchaser. Water from a municipal water supply facility enters the kiosk via manifold 33 and is connected to filters 5 that remove impurities, including both inorganic chemicals and undesirable microbes. Bottles are stored in cartridge 3 prior to filling in stacks as shown in FIG. 2. The bottles are retrieved by a robot arm and placed in a carousel to be filled by filler 4 in FIG. 1. The water is delivered through tubes to filler 4, and then injected into the bottle. The filled bottle is sealed and delivered to the consumer through the delivery mechanism 2, as shown in FIG. 1.

FIG. 2 illustrates the storage and handling of bottles in this embodiment. The bottles are stored in stacks 41 in a partially-completed state in the kiosk, with their bottoms only partially attached. During the filling and sealing process, the bottoms are attached. Filling collar 42 of filler 4 injects water through a hole in a pre-installed cap to fill the bottles. The use of a carousel allows one bottle to be filled while another is taken by the robot arm from storage and added to the carousel. Another bottle can then be filled immediately with a short rotation of the carousel without waiting for the robot arm to retrieve a bottle from the stack.

Figures 3A, 3B, 3C, 3D, 3E:
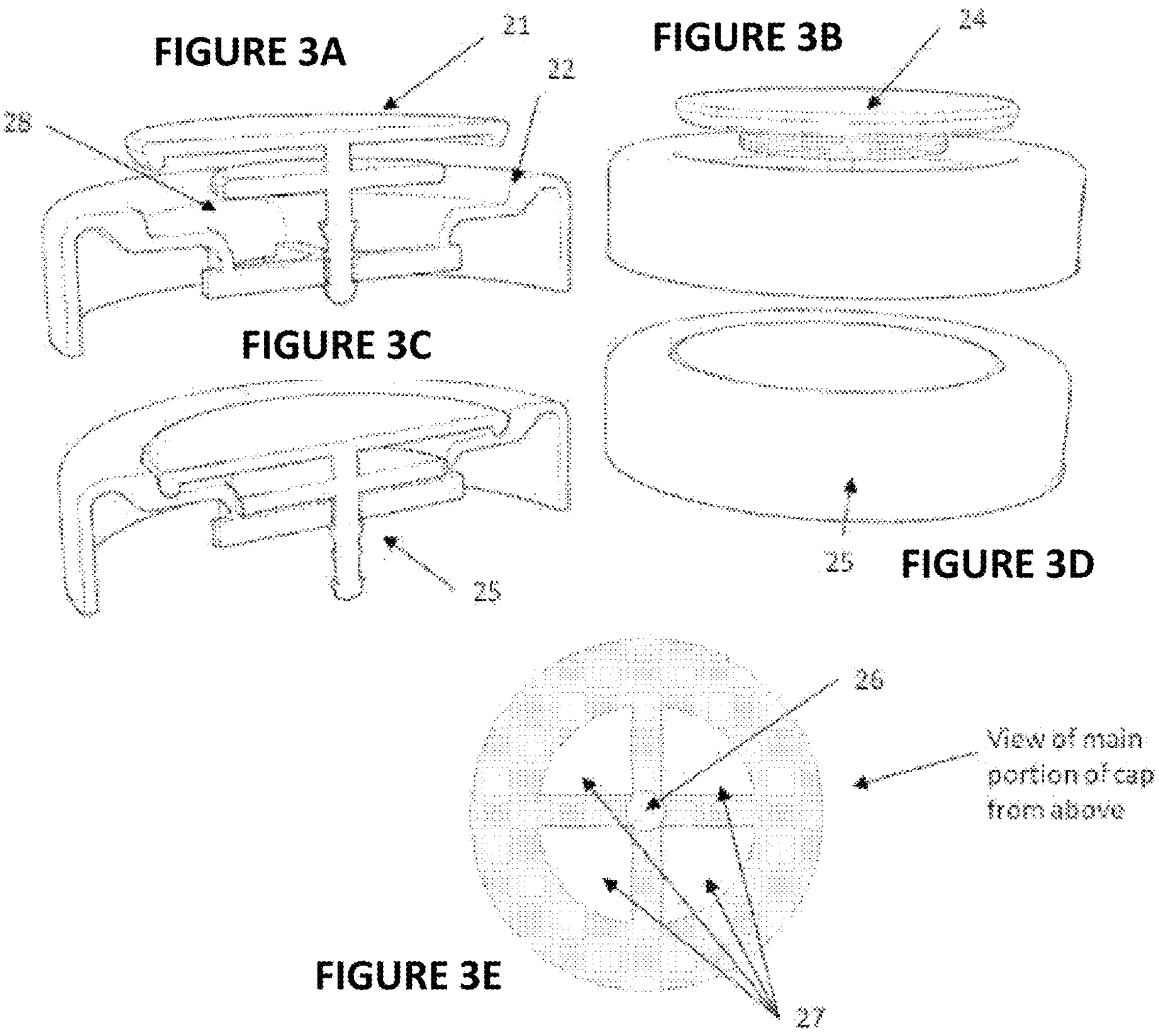
FIG. 3A is a cross-sectional view diagram showing a sealing plug and cap body, where the sealing plug is inserted partially into the cap body through a hole.
FIG. 3B is a perspective view of the sealing plug and cap body of FIG. 3A.
FIG. 3C is a cross-sectional view diagram showing a sealing plug and cap body, where the sealing plug is inserted completely into the cap body through the hole to form a permanently sealed combined cap assembly.
FIG. 3D is a perspective view of the permanently sealed combined cap assembly of FIG. 3C sealing plug and cap body.
FIG. 3E is a top view of the main cap body with the sealing plug removed where a hole at the center of the main cap body is for receiving the sealing plug that is to be inserted into the hole of the main cap body first partially and then completely after filling the bottle.
Figure 4A:
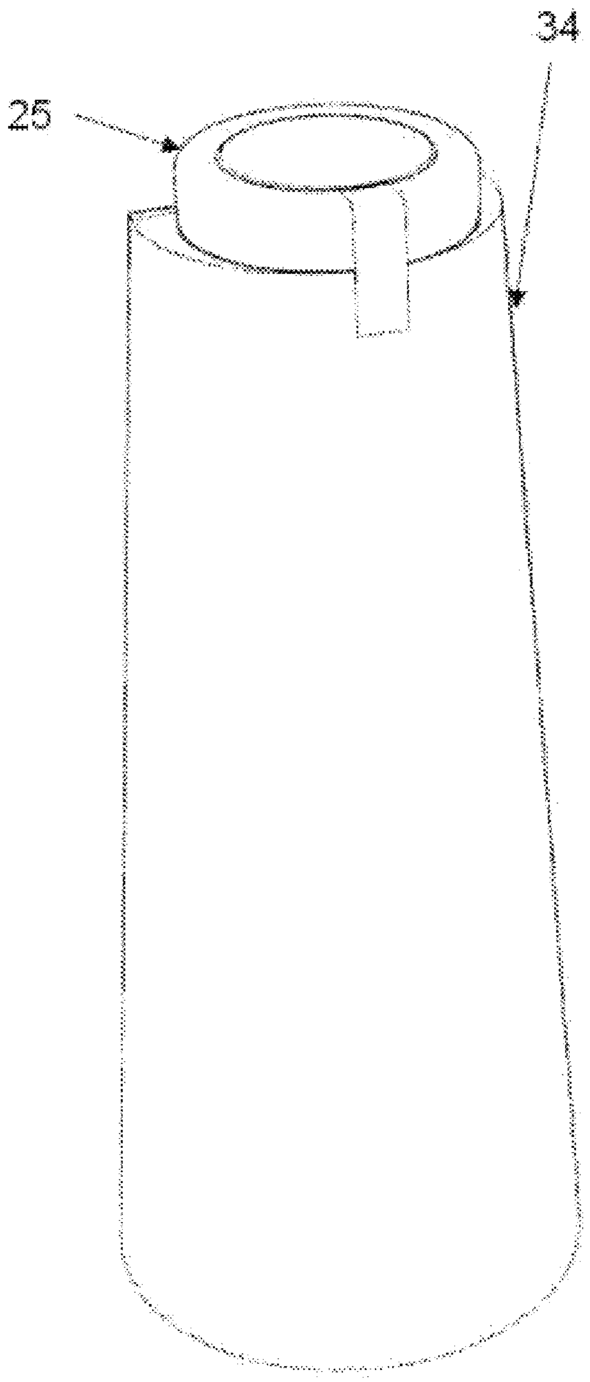
FIG. 4A is a diagram showing the bottle and cap assembly in a filled and permanently sealed condition.
Figure 4B:
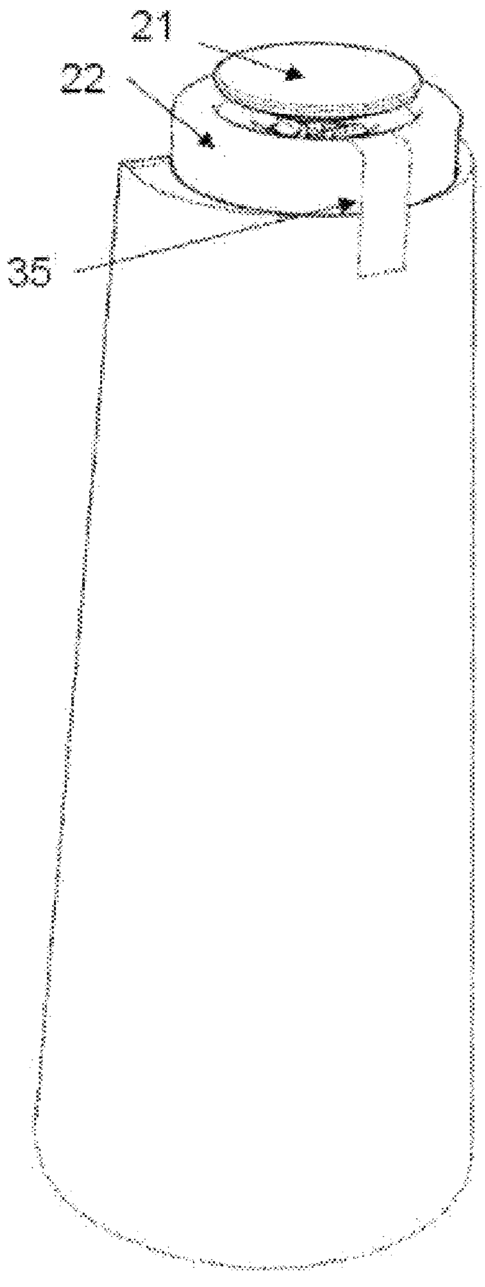
FIG. 4B is a diagram showing a bottle with the cap plug inserted partially and ready for filling.

FIGS. 3A-3E illustrate the cap system in a second embodiment to deliver the sealed bottle of an embodiment. In this embodiment, the cap has two parts: sealing plug 21 and cap body 22. Following manufacture of the sealing plug and cap body, the sealing plug is inserted partially into the cap body through hole 26 as illustrated in the cross-sectional view of FIG. 3A to form the partially sealed plug and cap body assembly 24 also shown in FIG. 3B in perspective. Four holes 27 are defined in the cap body as shown in FIGS. 3A and 3E. FIG. 3E is a top view of the main cap body with the sealing plug removed where a hole 26 at the center of the main cap body is for receiving the sealing plug that is to be inserted into the hole of the main cap body first partially and then completely after filling the bottle. This partially sealed plug and cap body assembly 24 is screwed onto the bottle at a centralized facility and the breakable paper or plastic seal 35 in FIG. 4B is attached via adhesive or as shrink-wrap commonly used in the industry. The partially sealed plug and cap body assembly 24 is delivered to the kiosk already screwed onto the bottle as shown in FIG. 4B. The beverage is injected through the four holes 27 in partially sealed plug and cap body assembly 24. After filling, a solenoid (not shown) plunges the plug 21 completely into the cap body 22 to create the sealed plug and cap body assembly 25 shown in FIG. 3C. The assembly 25 is then a permanently sealed combined cap assembly having an appearance attractive to the consumer and similar to typical plastic bottle caps. The permanently sealed combined cap assembly 25 is shown in the perspective view in FIG. 3D, and in cross-section in FIG. 3C. In other words, the holes 27 through which water is injected are permanently sealed following the filling of the bottle. The Kiosk 1 also preferably includes a refrigeration unit in manifold 33 that chills the water before it is injected into the bottle. The filler 4, the refrigeration unit, the solenoid unit that seals the holes 27, and the robot arm that delivers the filled bottle to the recipient are collectively referred to herein as the "mechanism." To consume the beverage, the consumer will first need to break the seal 35 by unscrewing the cap and removing it from bottle 34. The bottle and cap assembly in a filled and permanently sealed condition is shown in FIG. 4A.

FIG. 1 illustrates a further embodiment, in which the kiosk has a QR reader or camera 8 to read a QR code displayed by the purchaser's smart phone 6 in another embodiment. The QR code communicates the purchaser's identity and other information such as payment preferences. The QR code may also be displayed on the tablet computer 10 or on the laptop computer 9 instead of smart phone 6. A smart phone, a tablet computer and a laptop computer are referred to herein collectively as a handheld computer.

Figure 5:
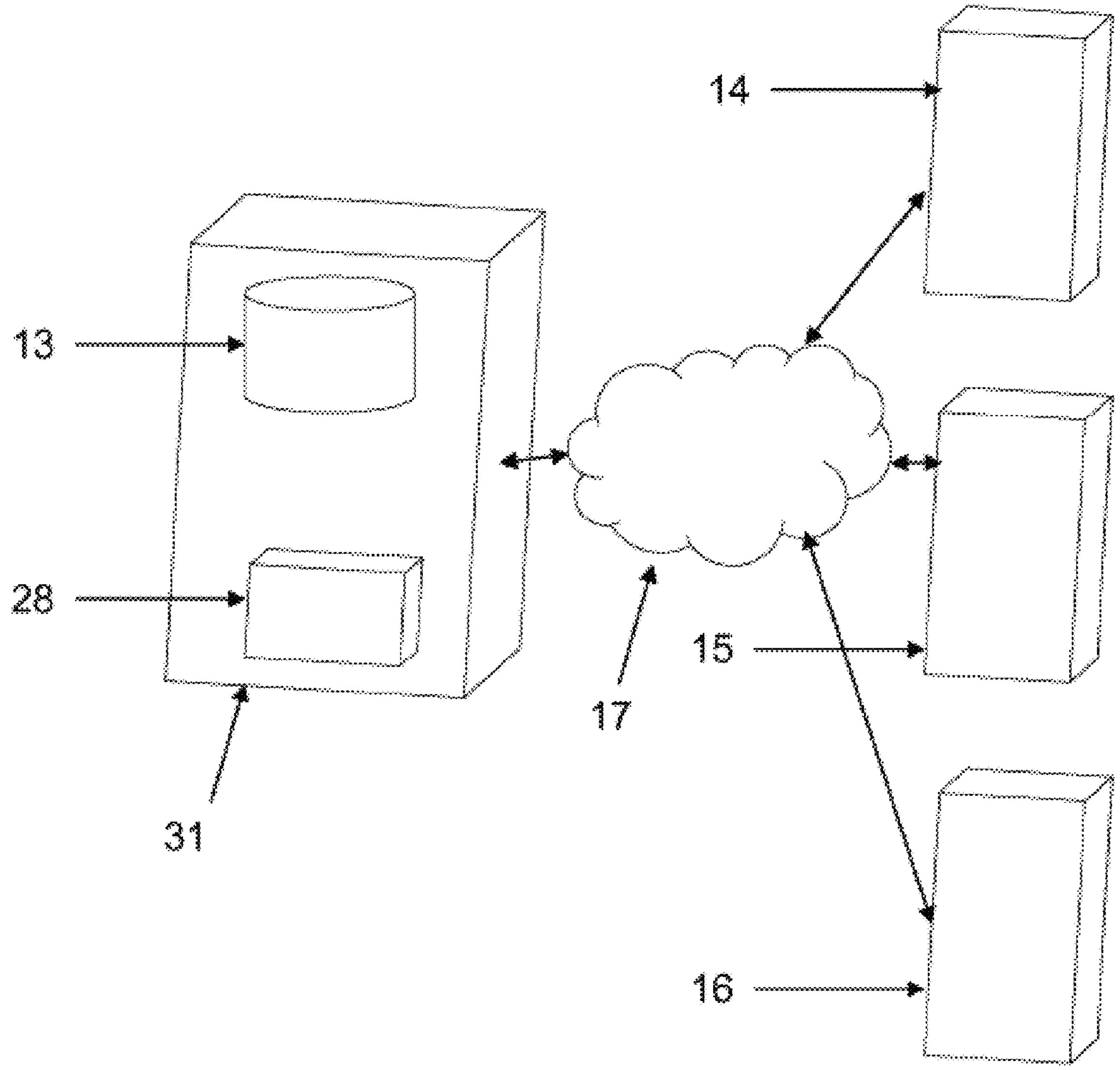
FIG. 5 shows a network of kiosks connected by a communication network to a central computer that contains a database of information about the kiosks and the customers buying beverages from the kiosks.

In a still further embodiment shown in FIG. 1, the purchaser may select additives for the water to be added following filtration and prior to filling the bottle. The selected additives are injected into the bottle with filler 4. Additives selected by the end consumer are communicated from the handheld computer such as smart phone 6 via wireless communications to receiver 7. The handheld computer may also be tablet computer 10 or laptop computer 9. A wireless receiver similar to receiver 7 may be used to establish two way communication between the kiosk and a centralized computer linked to or with a database providing information to the kiosk as illustrated in FIG. 5.

In a yet further embodiment illustrated in FIG. 1, the purchaser may communicate payment information such as identification and account number to the kiosk as well as authorization for payment for the filled container beverage by the purchaser's financial institution on behalf of the purchaser. Payment information for the end consumer or purchaser is communicated from the handheld computer such as smart phone 6 via wireless communications to receiver 7. The handheld computer may also be tablet 10 or laptop computer 9.

In another further embodiment illustrated in FIG. 1, the kiosk has a computer processor 11 that can communicate with a payment processing computer (not shown) at a payment facility (not shown) via wireless link 7 to enable automatic deduction from a pre-paid account that was funded by the beverage recipient in advance of the purchase.

In a further embodiment illustrated in FIG. 1, the kiosk 1 has computer processor 11 that contains or is linked to a database 12 of information about persons previously utilizing the kiosk. This database may be linked, to centralized database 13 illustrated in FIG. 5. In the embodiment illustrated in FIG. 5, the kiosk of FIG. 1 may be one of the kiosks 14, 15, 16 in and forms part of a network of kiosks 14, 15, and 16 that are connected via communications network 17 to a central database 13 connected to computer processor 28 and housed at centralized facility 31. The central database 13 contains in one embodiment information about persons previously utilizing any one of the kiosks that is part of the network of kiosks. Alternatively, the central database 13 may also be stored in the computer processor 28.

In yet another further embodiment illustrated in FIG. 1, the kiosk produces bottled beverages without creating wastewater. Water is received through intake manifold 33 and passed through filters 5 before bottling. Only sufficient water is processed in order to fill a bottle. Any excess water is stored in filler 4 and utilized in filling a subsequent bottle. Filters 5 may include the use of ultraviolet light, or may include a reverse osmosis filter, or a charcoal filter, or any combination or subset of the three. In one embodiment, the charcoal filter requires no flushing, because it is replaced via maintenance activities before reaching full utilization.

In one more embodiment illustrated in FIG. 1, tubing carries water from manifold 33 to filler 4. The kiosk utilizes only tubing that allows no detectable leaching of impurities in the liquid as the liquid flows through the tubing. Such tubing may include some stainless steel tubing. In yet another embodiment shown in FIG. 1, filler 4 includes tubes connected to additive containers stored in filler 4. The kiosk adds additives to the water via filler 4 during the filling process. The additives are selected by the recipient of the beverage. In one embodiment, the additive is one or more flavors. In other embodiments, the additive is carbonation, caffeine, or vitamins.

In an embodiment shown in FIG. 5, kiosk 14 has a wireless communications component (not shown but similar to wireless link 7 of FIG. 1) to communicate via communications network 17 to retrieve the beverage recipient's preferred set of additives from database 13 housed at centralized facility 31 remote from the kiosk. This may be performed by means of the wireless communications component or receiver of kiosk 14 receiving wireless signals from a handheld computer of the recipient. The wireless signals carry information about the purchaser's preferred additives, and the mechanism adds the preferred additives to the water filtered from the standard local water supply facility before filling the at least one container.

FIG. 5 illustrates a further embodiment of the invention in which the kiosk is part of a network of kiosks and where a closed-loop maintenance system is used to maintain the kiosk. Such kiosks are connected to computer processor 28 at central facility 31 via communications network 17. The centralized database 13 is connected to computer processor 28. The database may contain information about the kiosks and number of beverage containers filled at each kiosk in the network. The database may contain information about all the service calls to each kiosk and information about the history of the filters and pumps in each kiosk in the network.

FIG. 1 illustrates one further embodiment, in which bottles are stored in cartridge 3 prior to filling. The use of cartridges allows for efficient maintenance, because bottles can be pre-loaded into the cartridges at a central maintenance facility. The loaded cartridges can then be quickly exchanged in the kiosk, allowing for addition of hundreds of empty bottles with a minimum of manual labor and in a short time period.

Improved Container

Figure 28A:
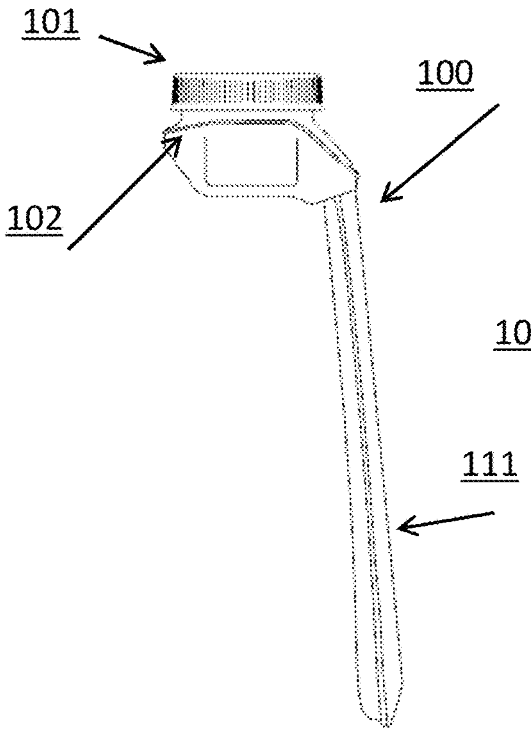
FIGS. 28A and 28B depict side views of a container for use with the embodiments of the liquid dispensing devices.
Figure 28B:
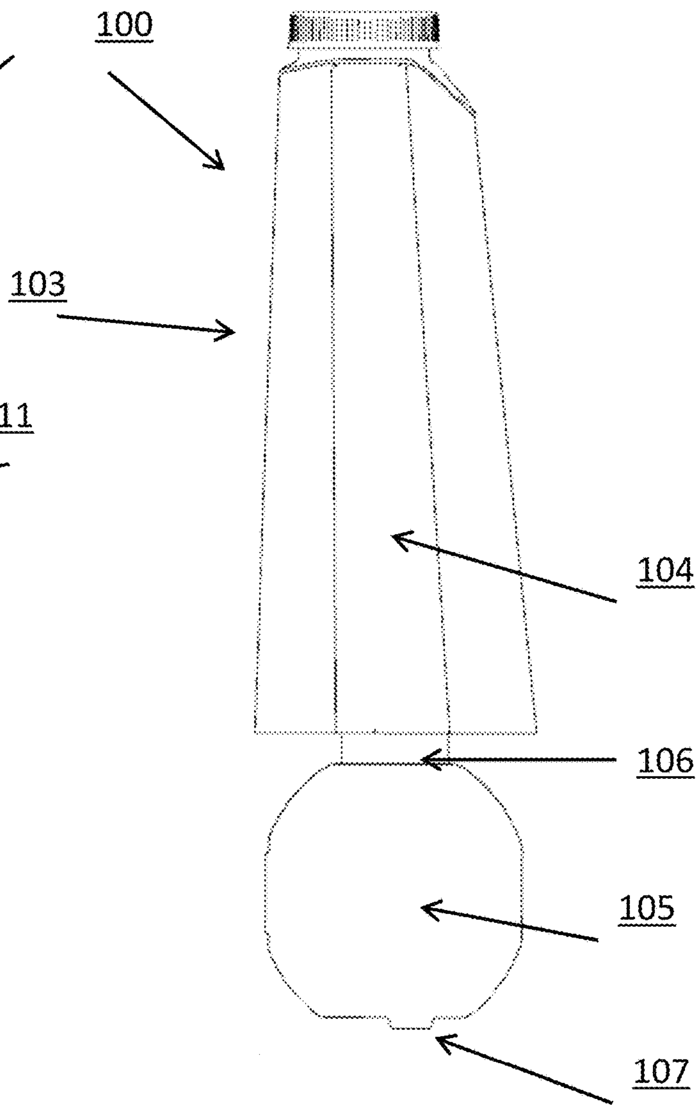

FIGS. 28A and 28B depict side-views of container 100. With reference to FIG. 28A, container 100 comprises cap 101, closure shoulder 102, and liquid-holding bag 111. With reference to FIG. 28B, shell 103 is now depicted. Shell 103 comprises body 104, hinge 106, and bottom flap 105. Bottom flap 105 comprises notch 107.

Figure 29A:
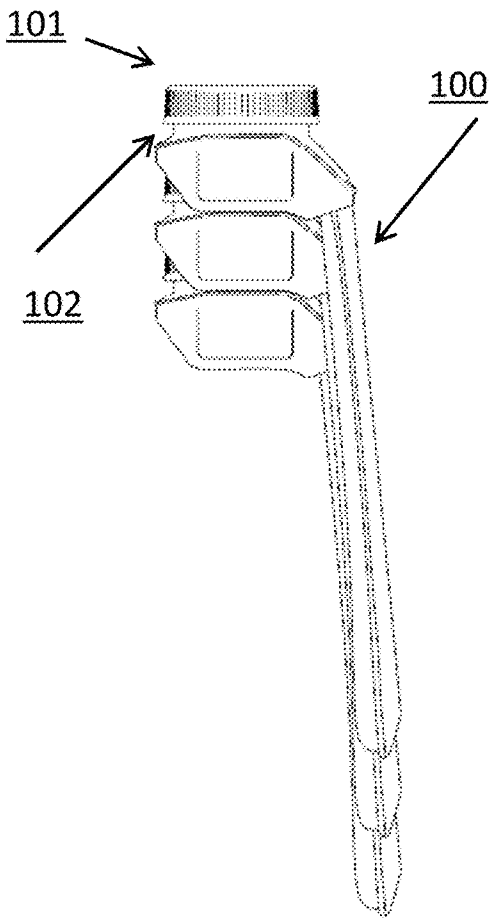
FIGS. 29A and 29B depict side views of a nested stack of containers.
Figure 29B:
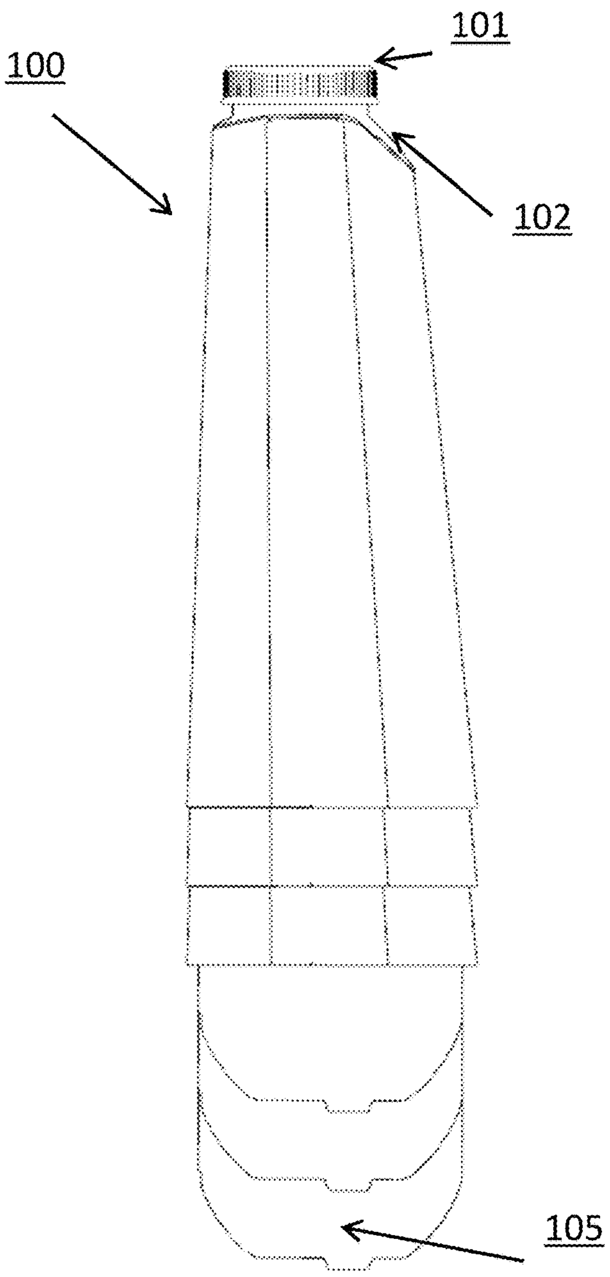

FIGS. 29A and 29B depict side-views of a stack of containers 100. As can be seen, container 100 is designed to allow a nested configuration, wherein multiple units of container 100 are stacked. Each container 100 optionally contains cap 101 already secured to its closure shoulder 102. The cap 101 of a first unit can fit within the closure shoulder 102 of a second unit stacked on top of the first unit. The bottom flap 105 of each unit is open and nested together as shown in FIG. 29B. One benefit of this aspect of the invention over stackable prior art bottles and cups is that because each container 100 contains a liquid-holding bag 111, when the multiple containers 100 are stacked together, each liquid-holding bag 111 remains completely sealed, thus maintaining sterility during transportation without the need to wrap the stack of containers 100 in a plastic bag. This further enhances the utility and ease-of-use of this aspect of the invention.

Figure 30A:
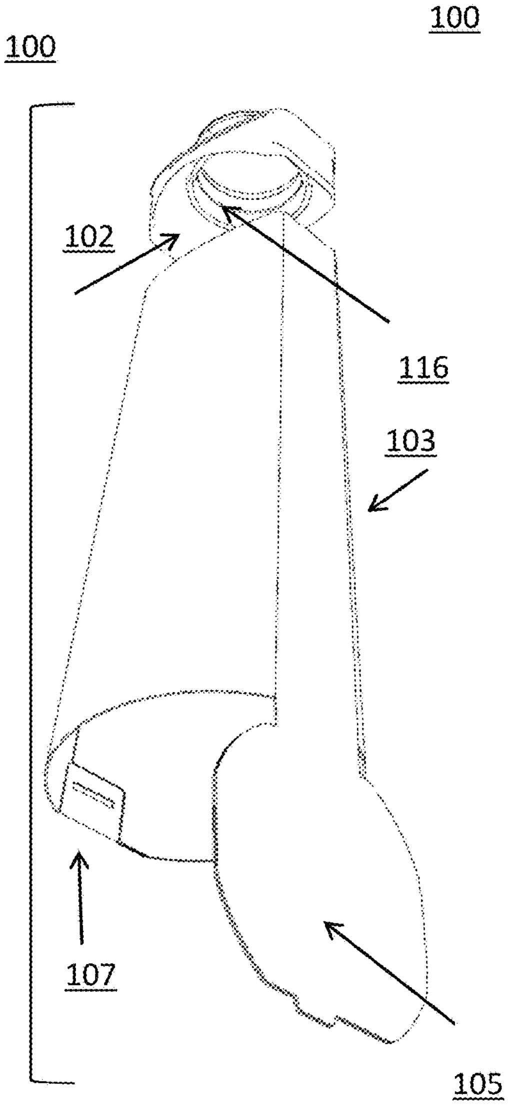
FIGS. 30A, 30B, and 30C depict the closing of a bottom flap of the container.
Figure 30B:
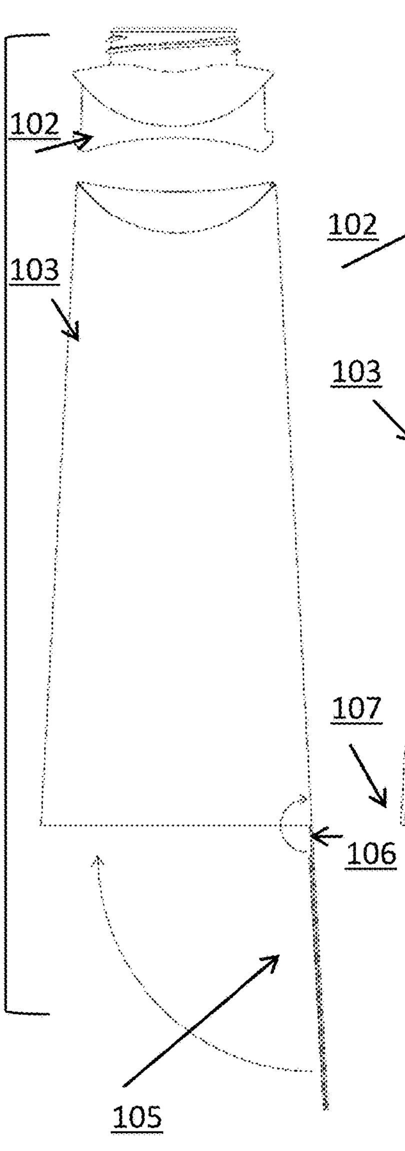
Figure 30C:
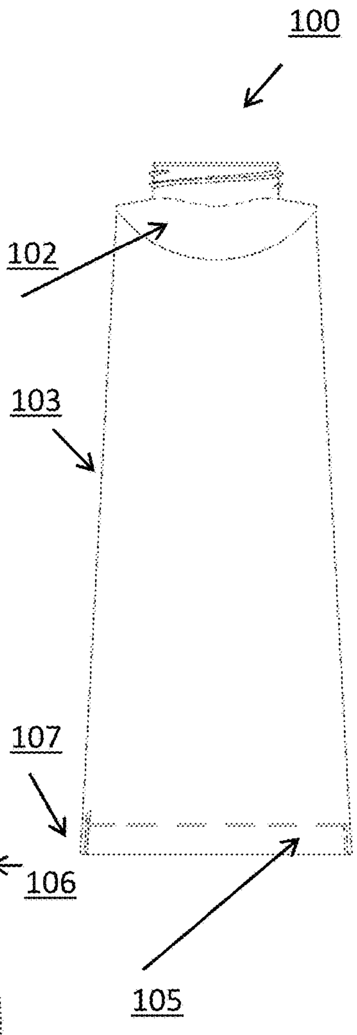

FIGS. 30A, 30B, and 30C depict side-views of container 100. In FIG. 30A, a bottom perspective view of closure shoulder 102 is included. Closure shoulder 102 comprises locking ring 116. In FIG. 30B, it can be seen that bottom flap 105 can move via hinge 106 from an unclosed position to a closed position, wherein bottom flap 105 closes the bottom of container 100 such that it is substantially perpendicular to the side wall of shell 103. In FIG. 30C, it can be understood that notch 107 engages with the side wall of shell 103 (optionally, by inserting into a slit in the slide wall of shell 103) to hold bottom flap 105 in place.

Figure 31A:
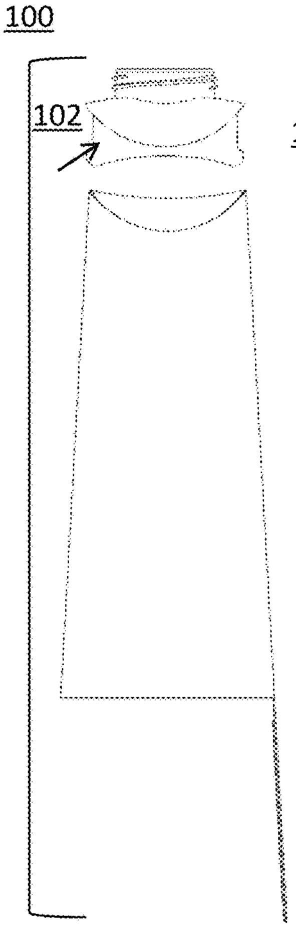
FIGS. 31A and 31B depict a side-view of a locking mechanism in the container.
Figure 31B:
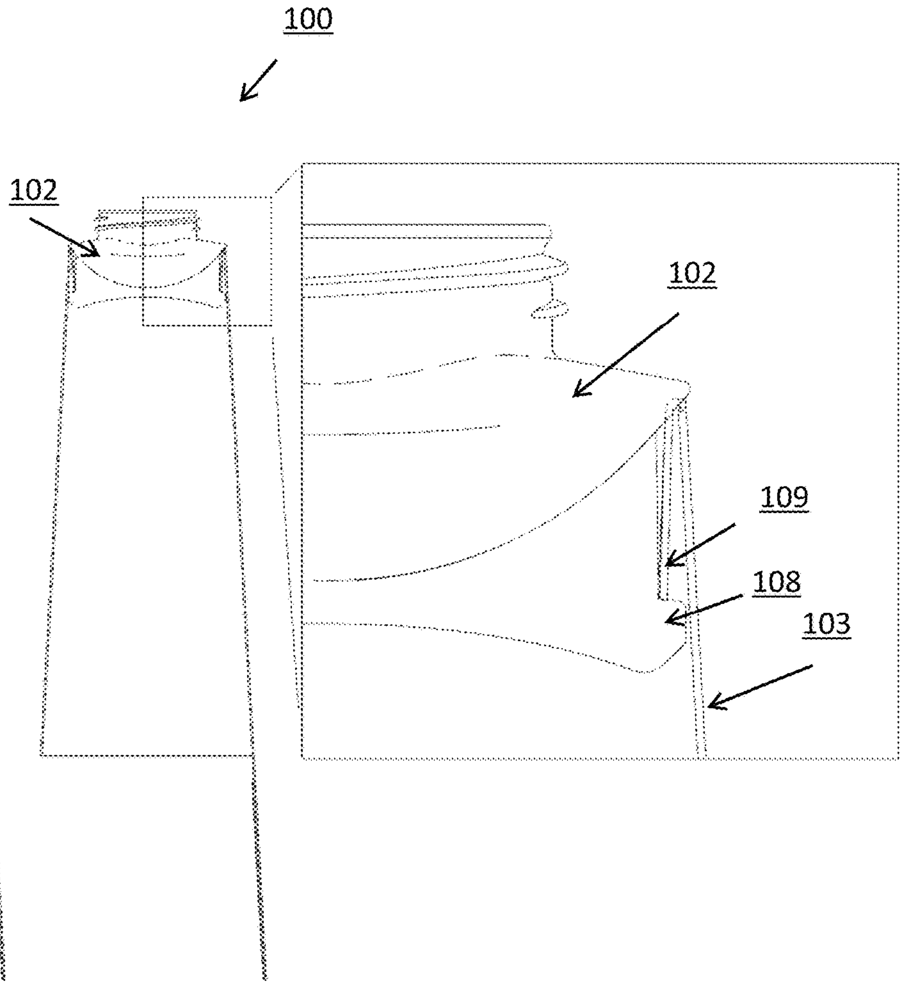

FIGS. 31A and 31B depict additional side-views of container 100 and show the mechanism which retains the shoulder 102 to the paper shell 103. FIG. 31B contains an enlarged view of part of closure shoulder 102 after it is inserted into shell 103. Closure shoulder 102 comprises protrusion 108 formed by a cavity in closure shoulder 102. Shell 103 comprises locking tab 109, which here is part of shell 103 folded downward. Locking tab 109 engages with protrusion 108, which prevents closure shoulder 102 from being pulled out of shell 103 during normal usage by a consumer.

Figure 32A:
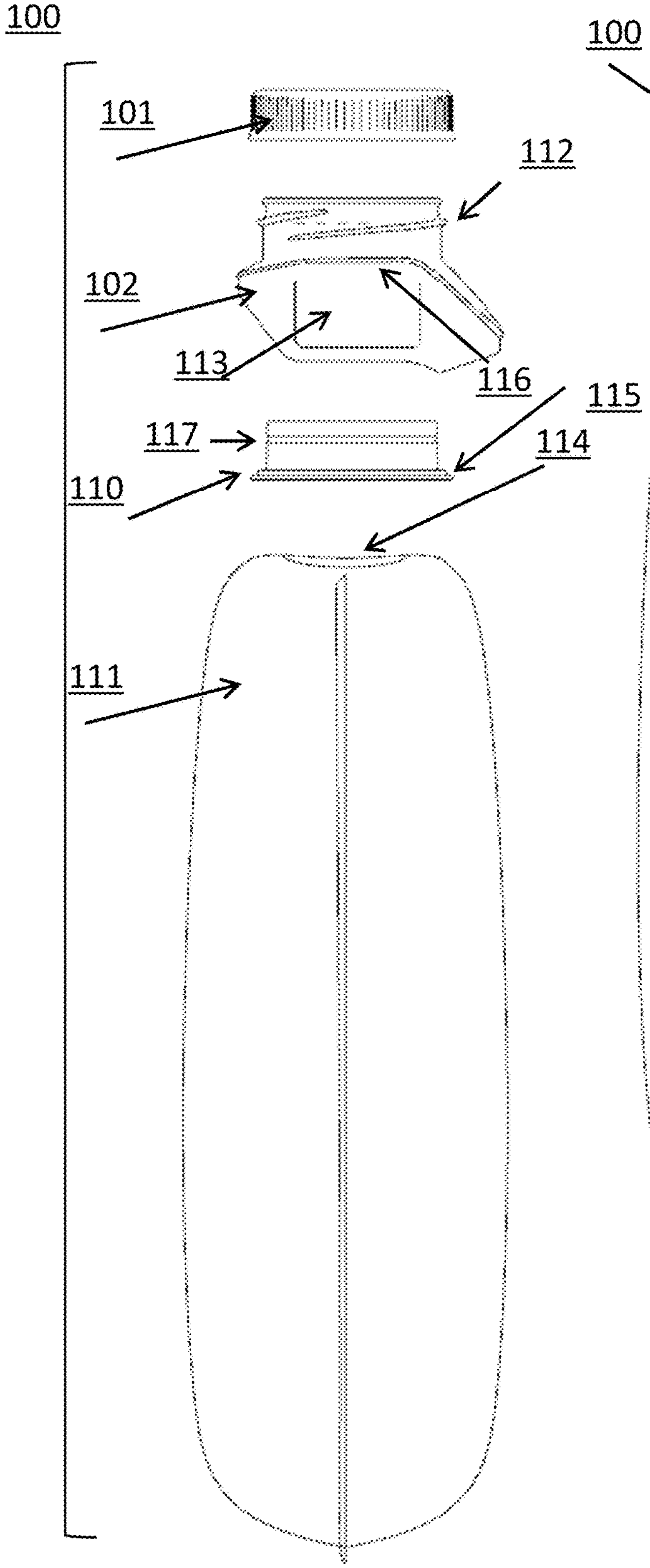
FIGS. 32A and 32B depict a side-view of a securing mechanism in the container that secures a liquid-holding bag between a mechanical sealing ring and the closure shoulder.
Figure 32B:
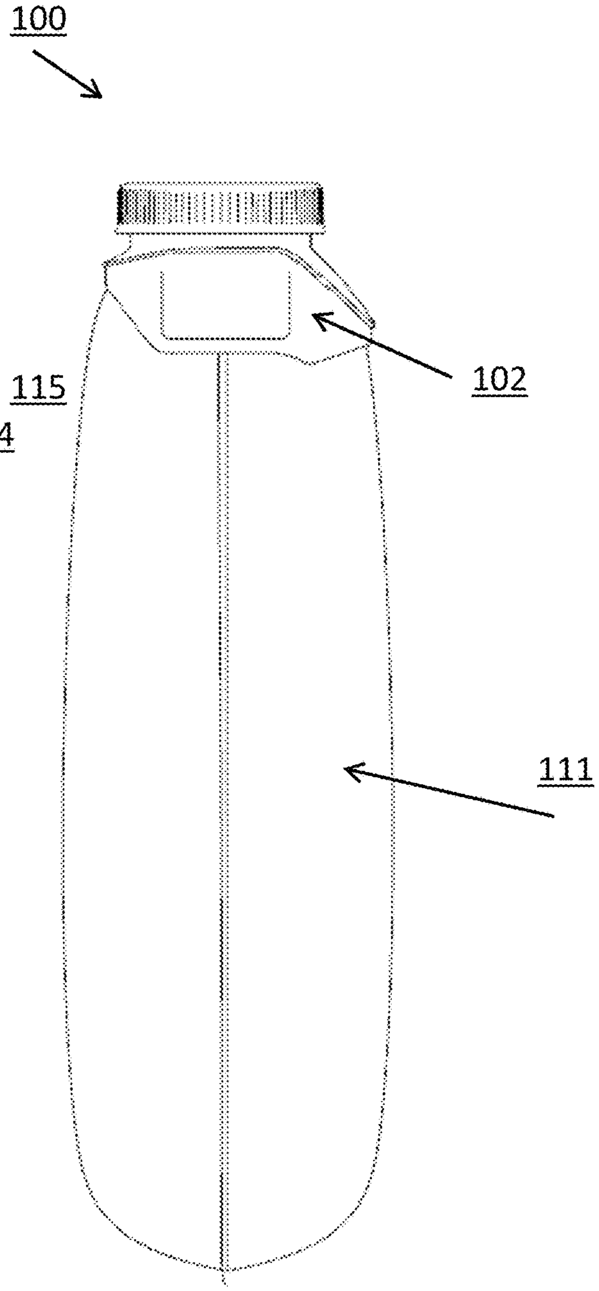

FIGS. 32A and 32B depict additional side-views of container 100 without a shell. Cap 101 can screw onto a drinking spout 112 of closure shoulder 102. Drinking spout 112 comprises screw threads on its outer vertical surface. Closure shoulder 102 comprises cavity 113, which includes locking ring 116 for receiving locking ring 117 on mechanical sealing ring 110. Container 100 further comprises liquid-holding bag 111, which is capable of holding water or other liquid. The outer diameter of the top surface of the bottom lip 115 of mechanical sealing ring 110 is larger than the opening 114 of liquid-holding bag 111. Optionally, the diameter of locking ring 117 of mechanical sealing ring 110 also is larger than opening 114 of liquid-holding bag 111, such that the opening 114 is stretched to receive mechanical sealing ring 110.

During manufacturing of liquid-holding bag 111, mechanical sealing ring 110 is placed into liquid-holding bag 111 from the bottom of liquid-holding bag 111 (which initially is open on the bottom). Mechanical sealing ring 110 is then moved upward until opening 114 rests on top surface of the bottom lip 115 of mechanical sealing ring 110. Mechanical sealing ring 110 is then pushed into closure shoulder 102 such that locking ring 117 is pushed over locking ring 116, which locks mechanical sealing ring 110 into place within closure shoulder 102, which secures liquid-holding bag 111 to closure shoulder 102. The bottom of liquid-holding bag 111 is then sealed using heat, ultrasound (e.g., Ultrasonic welding), or other known means.

Figure 33A:
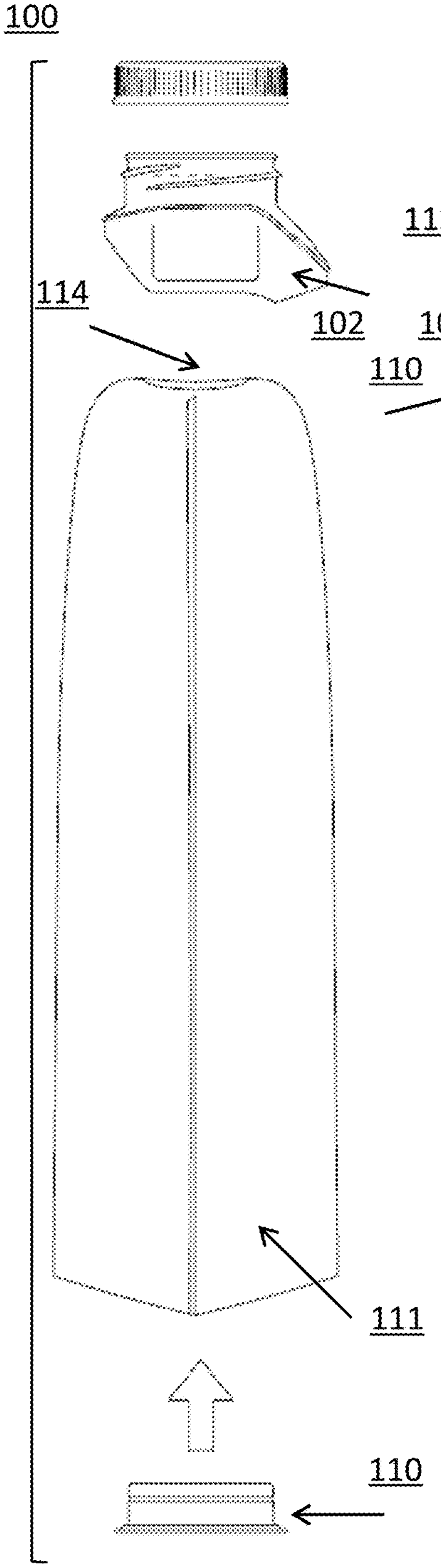
FIGS. 33A, 33B, and 33C depict a side-view of the container in various states of assembly.
Figure 33B:
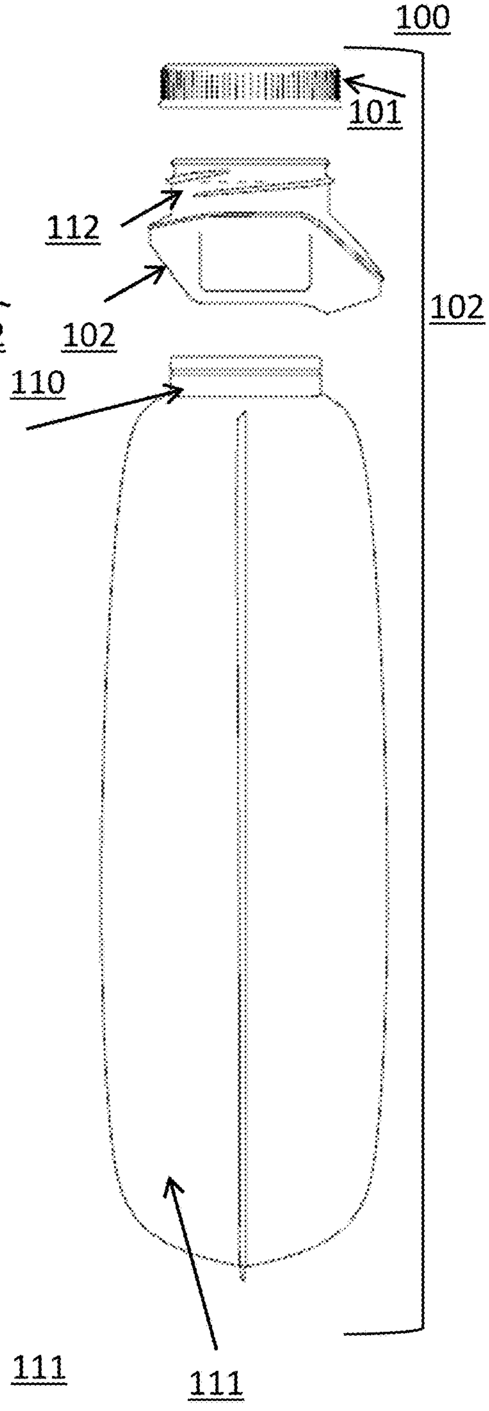
Figure 33C:
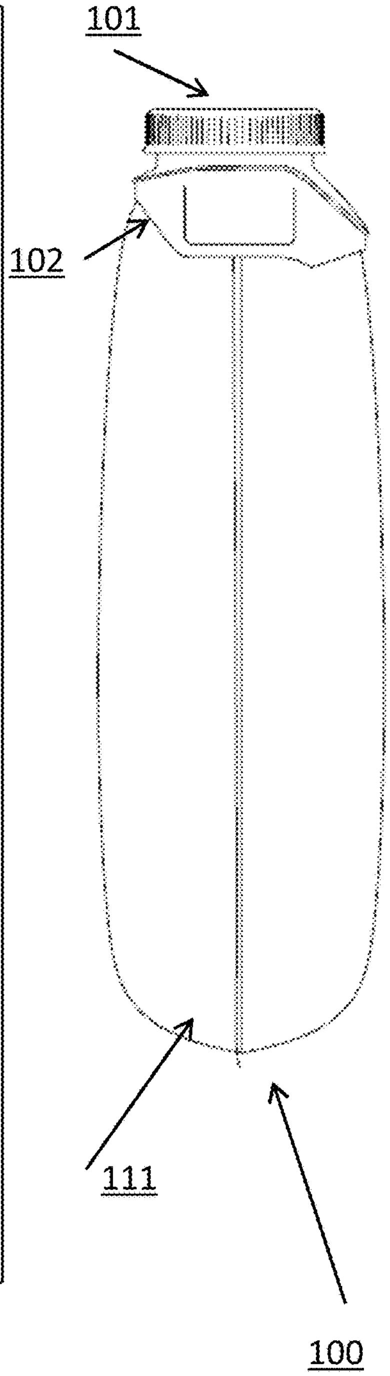

FIGS. 33A, 33B, and 33C depict additional side-views of container 100 through the assembly steps. In FIG. 33A, liquid-holding bag 111 has an open bottom. Mechanical sealing ring 110 is placed through the bottom of liquid-holding bag 111 (as discussed above) and is secured to closure shoulder 102. In FIG. 33B, mechanical sealing ring 110 extends through opening 114 of liquid-holding bag 111 (which has now been sealed on the bottom) and is secured to closure shoulder 102. In FIG. 33C, cap 101 is screwed onto threads of drinking spout 112. This can be performed by capper/decapper 606, described below with reference to FIG. 6 and FIG. 22. As used herein, the terms "capper/decapper" and "capper" will be used interchangeably, as the same device can be used to remove a cap from a container or to add a cap to the container.

Figure 34:
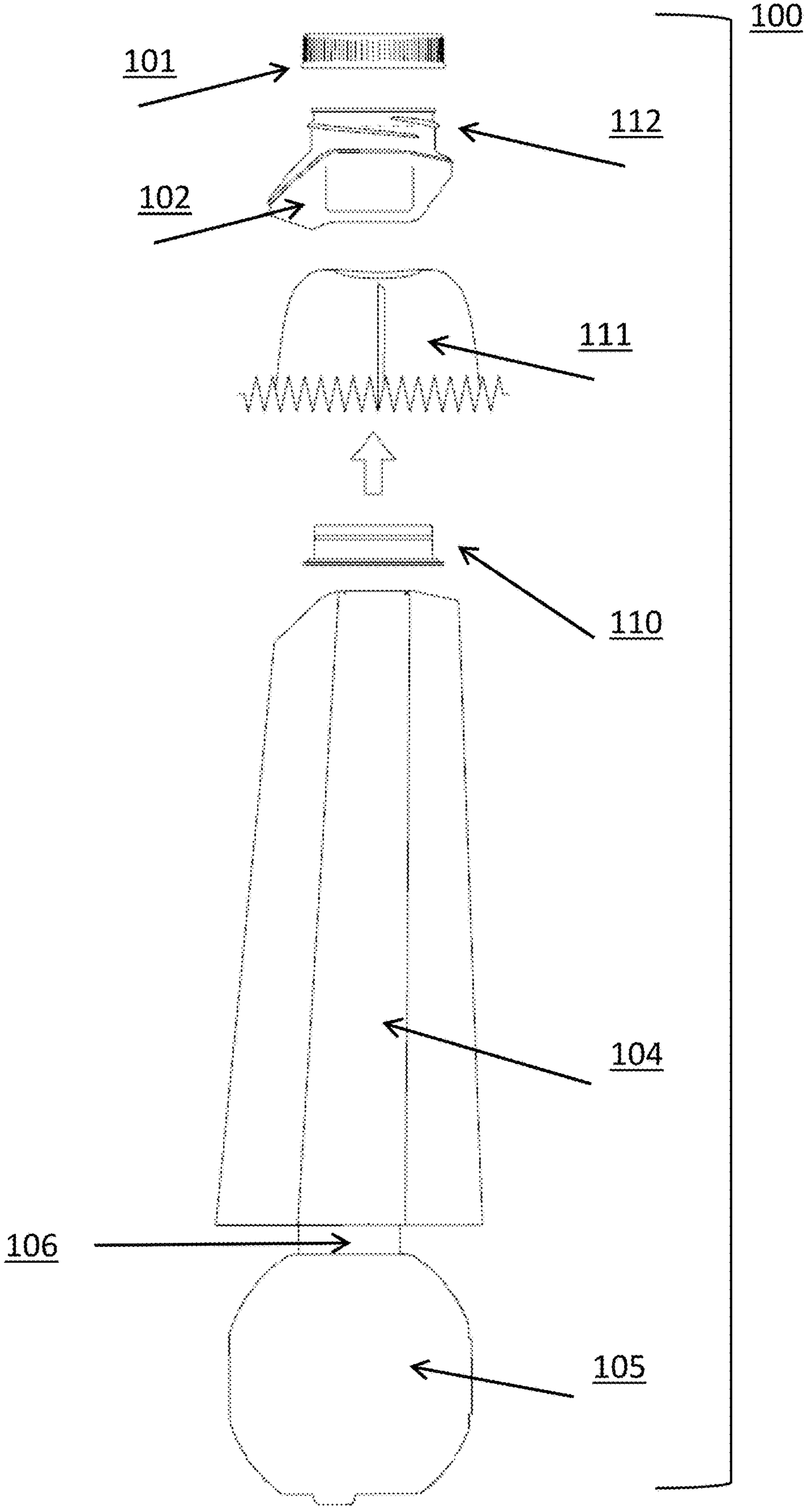
FIG. 34 depicts an exploded side view of various components of the container.

FIG. 34 depicts another side-view of container 100, showing all the individual components that comprise the described bottle. Again, mechanical sealing ring 110 is secured to closure shoulder 102, which secures liquid-holding bag 111 between mechanical sealing ring 110 and closure shoulder 102 in a watertight fashion.

Figure 35A:
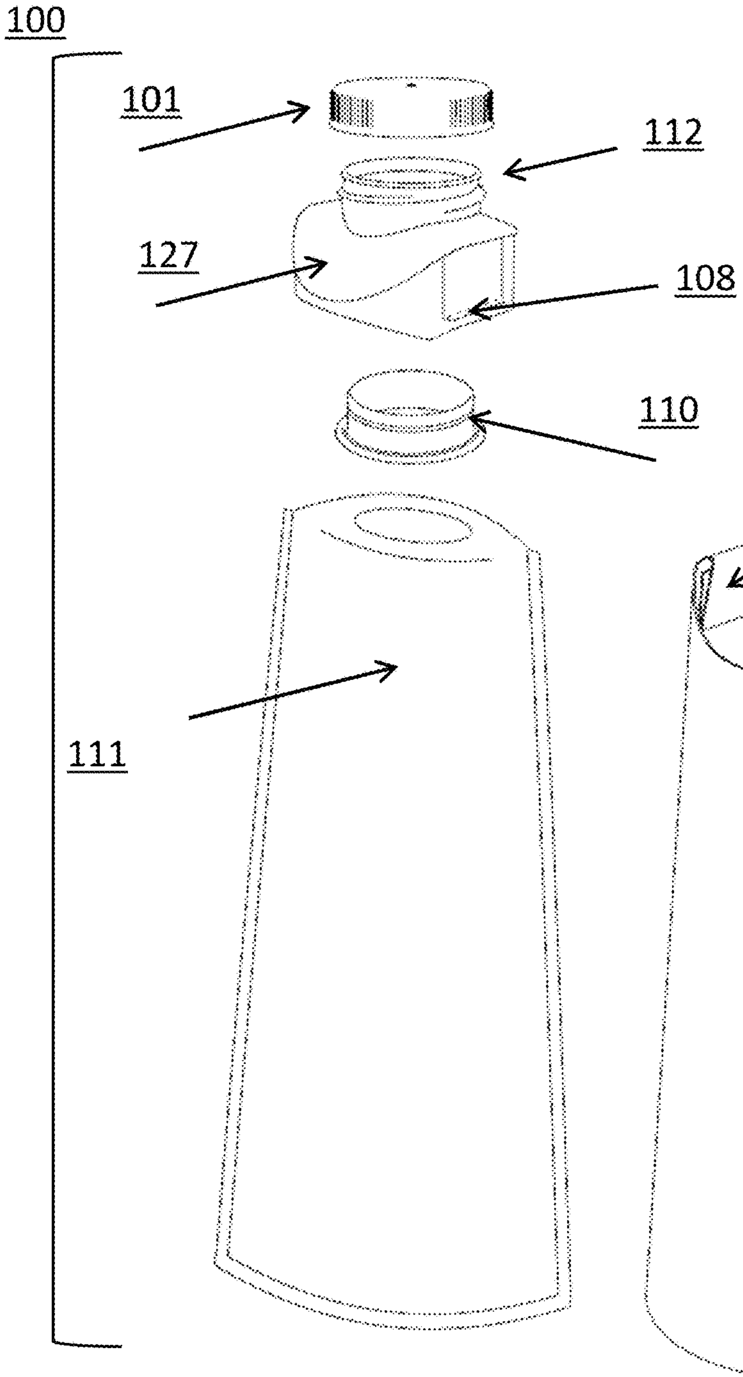
FIGS. 35A and 35B depict additional exploded side views of various components of the container.
Figure 35B:
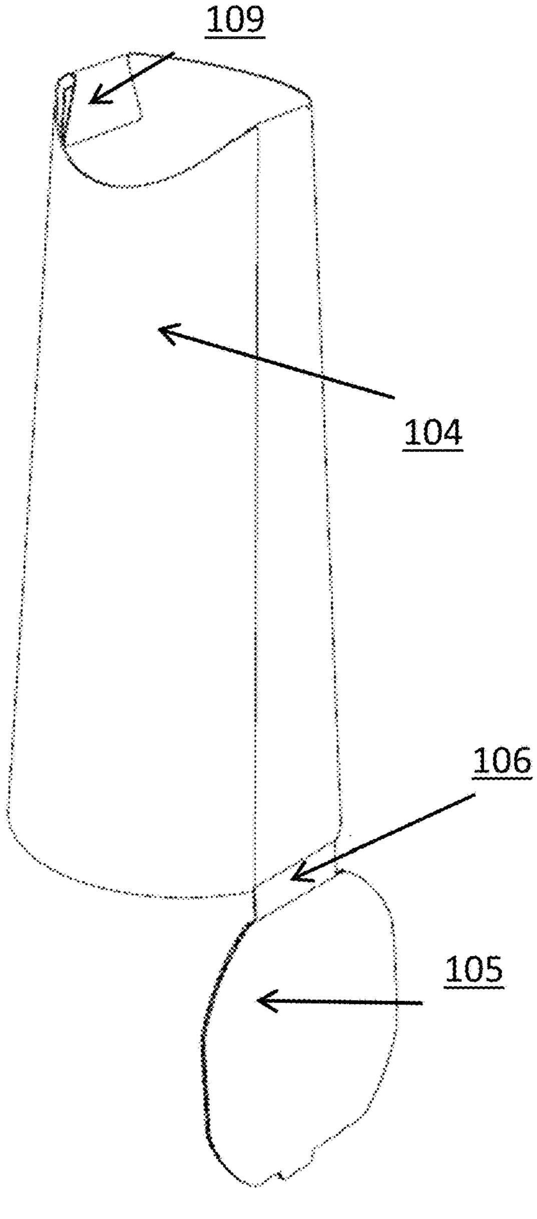

FIGS. 35A and 35B depict another side-view of components of container 100. Locking tab 109 and protrusion 108 are depicted. The liquid holding assembly is on the left, which is inserted into the paper shell depicted on the right.

With reference to now to FIGS. 28-35, the assembly of container 100 will be further discussed. Mechanical sealing ring 110, closure shoulder 102, and cap 101 are all injection-molded, preferably using compostable polymers, Liquid-holding bag 111 is blown film which is cut and then heat-sealed to the form a bag. The bottom of liquid-holding bag 111 is sealed after the mechanical sealing ring 110 is inserted into liquid-holding bag 111.

The assembly comprising liquid-holding bag 111 and sealing ring 110 is inserted into cavity 113 of closure shoulder 102, where collectively those components form a liquid-tight seal and are permanently fixed because of a strong push-fit and engagement of locking rings 116 and 117. The bottom of liquid-holding bag 111 is then heat sealed, leaving only one opening in liquid-holding bag 111 (i.e., drinking spout 112 on closure shoulder 102, through opening 114). Cap 101 is then tightened onto drinking spout 112 resulting in a sealed container. The sealed container is then inserted into shell 103, securing the closure assembly to it without the use of adhesives. This can be performed by liquid dispensing device 600, described below.

Improved Liquid Dispensing Device

An improved liquid dispensing device that builds upon the design of kiosk 1 will now be described with reference to FIGS. 6-27.

Figure 6:
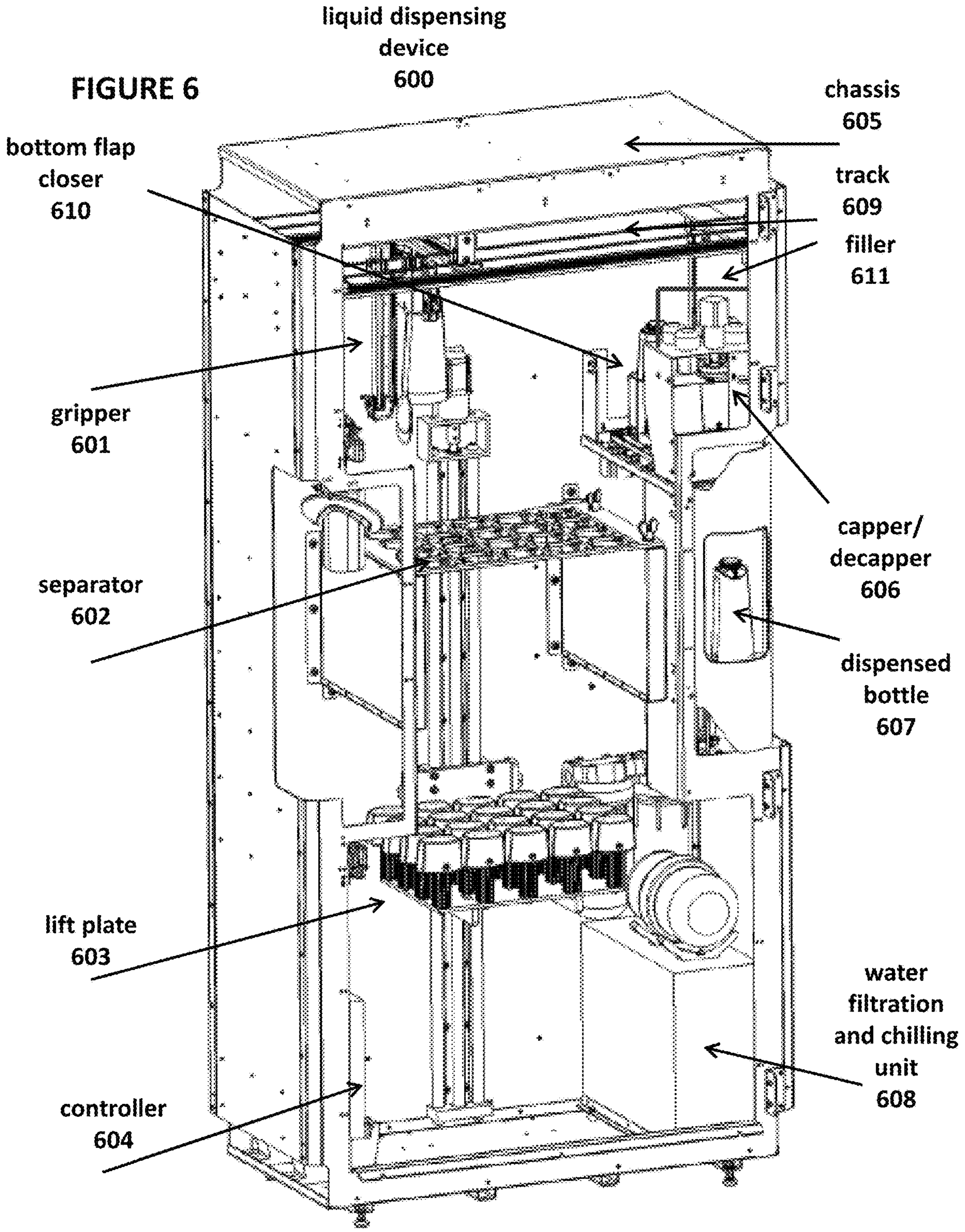
FIG. 6 is a diagram of a second embodiment of a liquid dispensing device.

FIG. 6 depicts liquid dispensing device 600. Liquid dispensing device 600 comprises chassis 605 constructed from metal, plastic, or other firm material. Liquid dispensing device further comprises gripper 601, separator 602, lift plate 603, controller 604, capper/decapper 606, water filtration and chilling unit 608, track 609, bottom flap closer 610, filler 611, and other structures as shown. Using the structures and methods described herein, liquid dispensing device 600 ultimately provides dispensed bottle 607 to a user.

Lift plate 603 is a plate controlled by a linear actuator or other motor that pushes stacked containers 100 (not shown) upward as containers 100 are removed from the top of the stack. Separator 602 enables lift plate 603 to push the top container 100 toward gripper 601 while preventing all containers 100 below top container 100 to remain at or below separator 602.

Gripper 601 is an electrically-controlled robotic arm that can grab a container (not shown) and move the container in three directions (horizontally, laterally, and vertically) using track 609 and other tracks that are not shown. The movement of gripper 601 in these three directions optionally is controlled by a stepper motor.

Bottom flap closer 610 is a mechanical structure that is used to close the bottom flap of container 100.

Capper/decapper 606 removes a cap (such as cap 101, discussed below) from container 100 and secures the cap back onto container 100.

Controller 604 comprises hardware and software components for controlling the operation of liquid dispensing device 600. Controller 604 can comprise a motherboard with integrated circuits and other structures, or it can be contained wholly within a single integrated circuit (such as a system-on-chip or SoC).

Water from a municipal water supply or other external source enters liquid dispensing device 600 via a manifold (not shown), where it runs through filters in water filtration and chilling unit 608 so that impurities are removed, including both inorganic chemicals and undesirable microbes. Water filtration and chilling unit 608 optionally can chill the filtered water to a desired temperature.

During operation of liquid dispensing device 600, a user requests a filled container using an interface (not shown), such as a touch screen, mechanical buttons, a mobile app, voice recognition, or other known interfaces. The user optionally can request that certain additives (such as flavors, caffeine, health supplements, etc.) be included in the liquid. Controller 604 receives the request and controls the actions of various components of liquid dispensing device 600. Before the request by the user, lift plate 603 already will have pushed stacks of containers upward such that at most a single container protrudes from each aperture in separator 602. Gripper 601 grabs a single container from the top of separator 602 and moves the container using track 609 and other tracks to bottom flap closer 610, where the bottom of the container is closed. Capper/decapper 606 then removes the cap from the container. The container is then filled with liquid by filler 611 (and any requested additives are also inserted into the container), and then capper/decapper 606 secures the cap back onto the container. Gripper 601 then grabs the filled container and dispenses it to the user.

Additional detail regarding the components of liquid dispensing device 600 will now be provided.

Figure 7A:
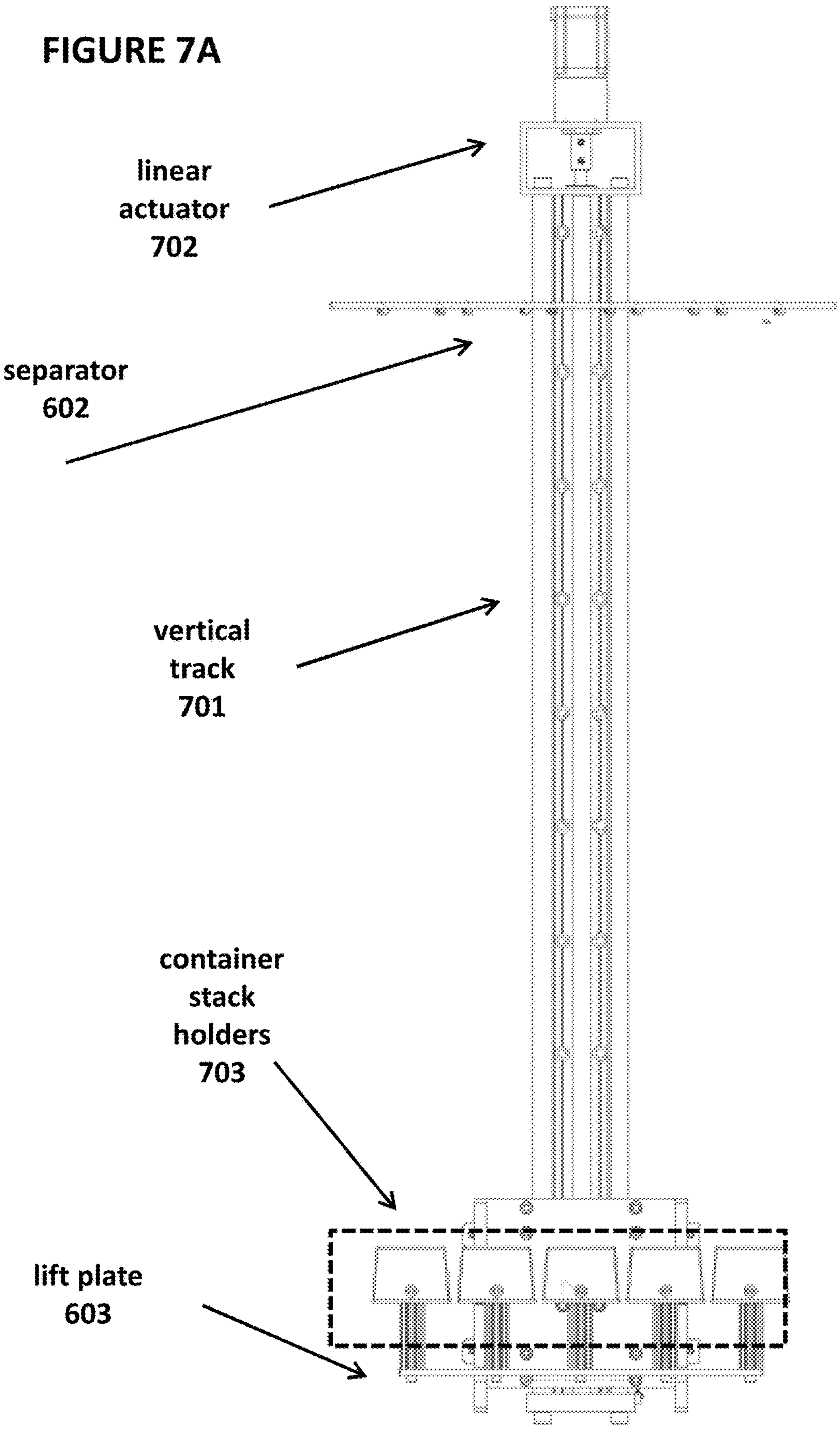
FIG. 7A depicts a lift plate, separator, and related components of the liquid dispensing device.
Figure 7B:
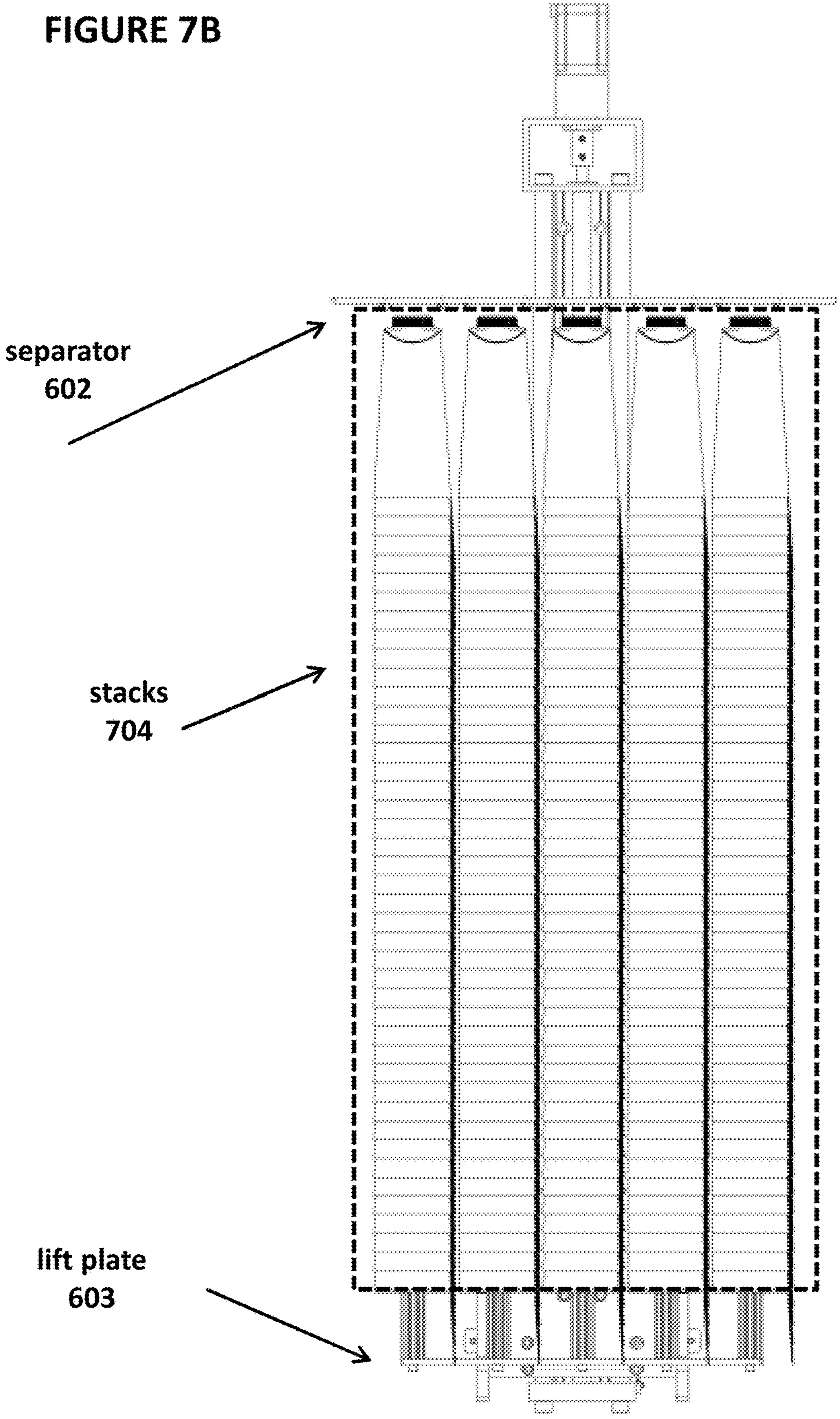
FIG. 7B depicts a lift plate, separator, and related components of the liquid dispensing device with stacks of containers.
Figure 7C:
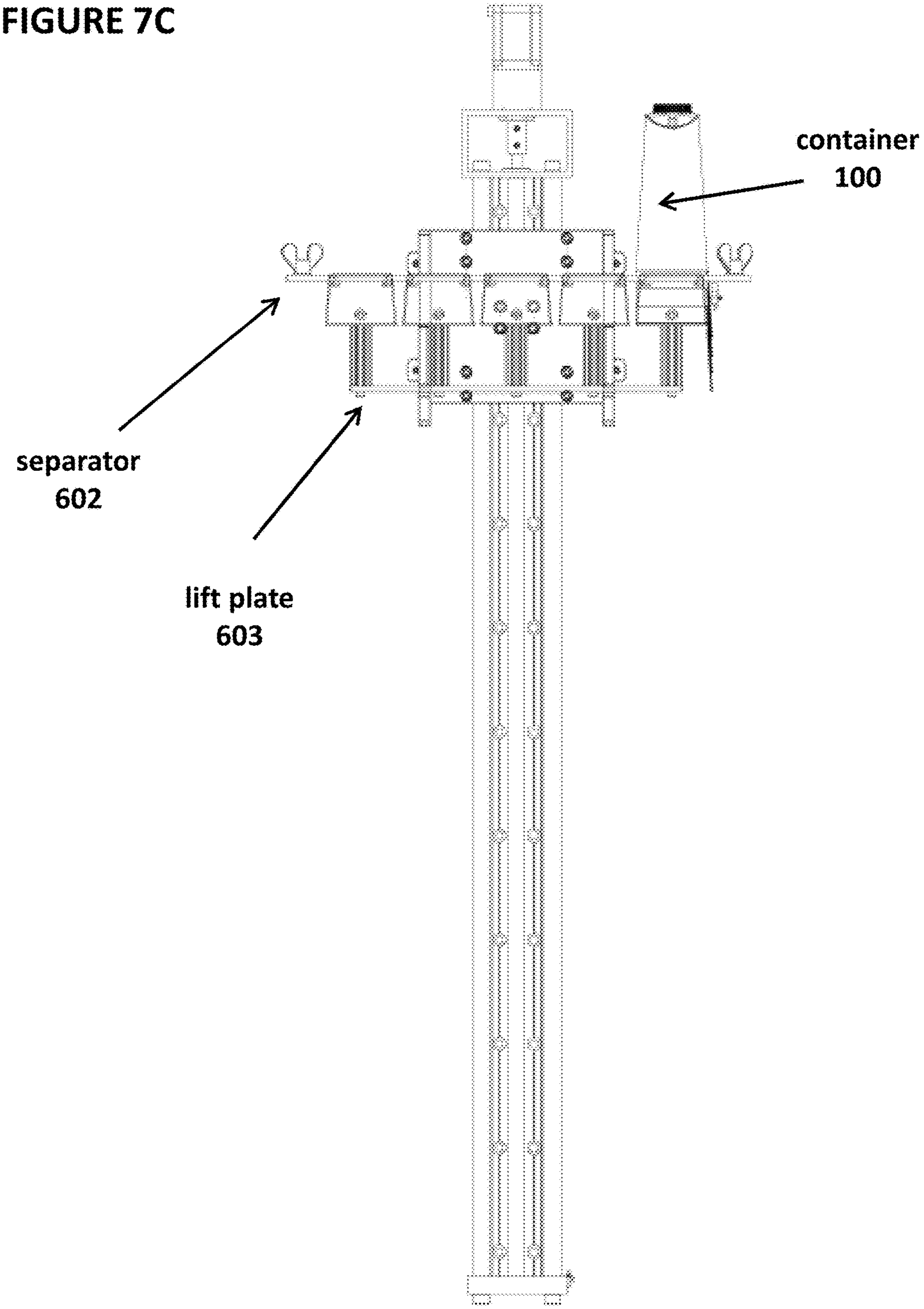
FIG. 7C depicts a lift plate, separator, and related components of the liquid dispensing device with a single container in the fully upward position.

FIGS. 7A-7C depict additional detail regarding separator 602 and lift plate 603.

With reference to FIG. 7A, a plurality of container stack holders 703 are placed on lift plate 603 and are shaped to receive the bottom of containers 100. Lift plate 603 is attached to vertical track 701 and is powered by linear actuator 702. Linear actuator 702 is controlled by controller 604

FIG. 7B depicts a plurality of stacks 704, each stack 704 comprising a plurality of containers 100 in a stacked, nested formation. The bottom container 100 in each stack 704 is placed on a container stack holder 703. Lift plate 603 ideally will push stacks 704 upward into separator 602.

FIG. 7C depicts lift plate 603 at its maximum height, which will be achieved when no more than one container 100 is contained on each container stack holder 703.

Figure 8:
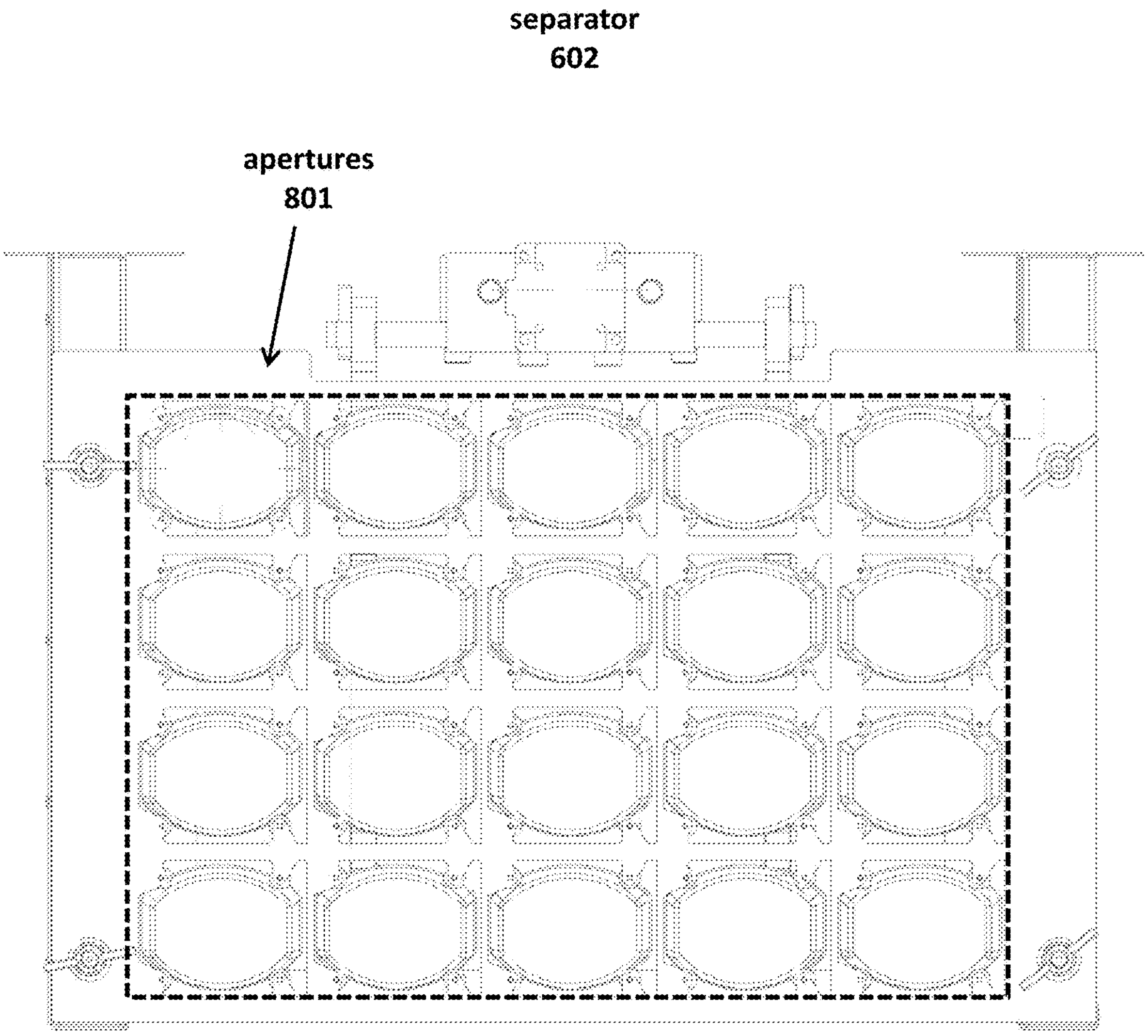
FIG. 8 depicts a top view of the separator of the liquid dispensing device and the lift plate without stacks of bottles.
Figure 9:
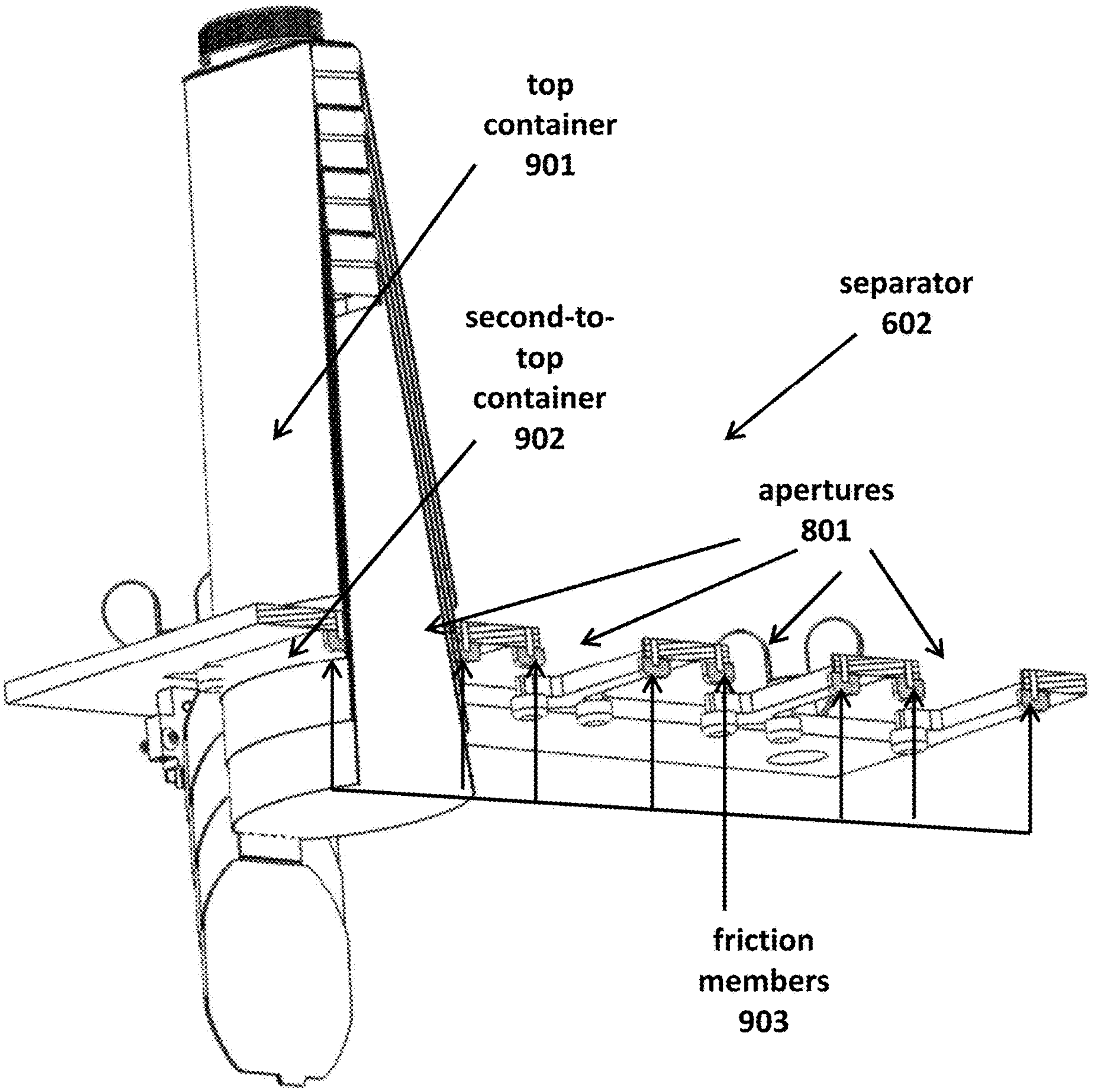
FIG. 9 depicts friction members in the separator.
Figure 10:
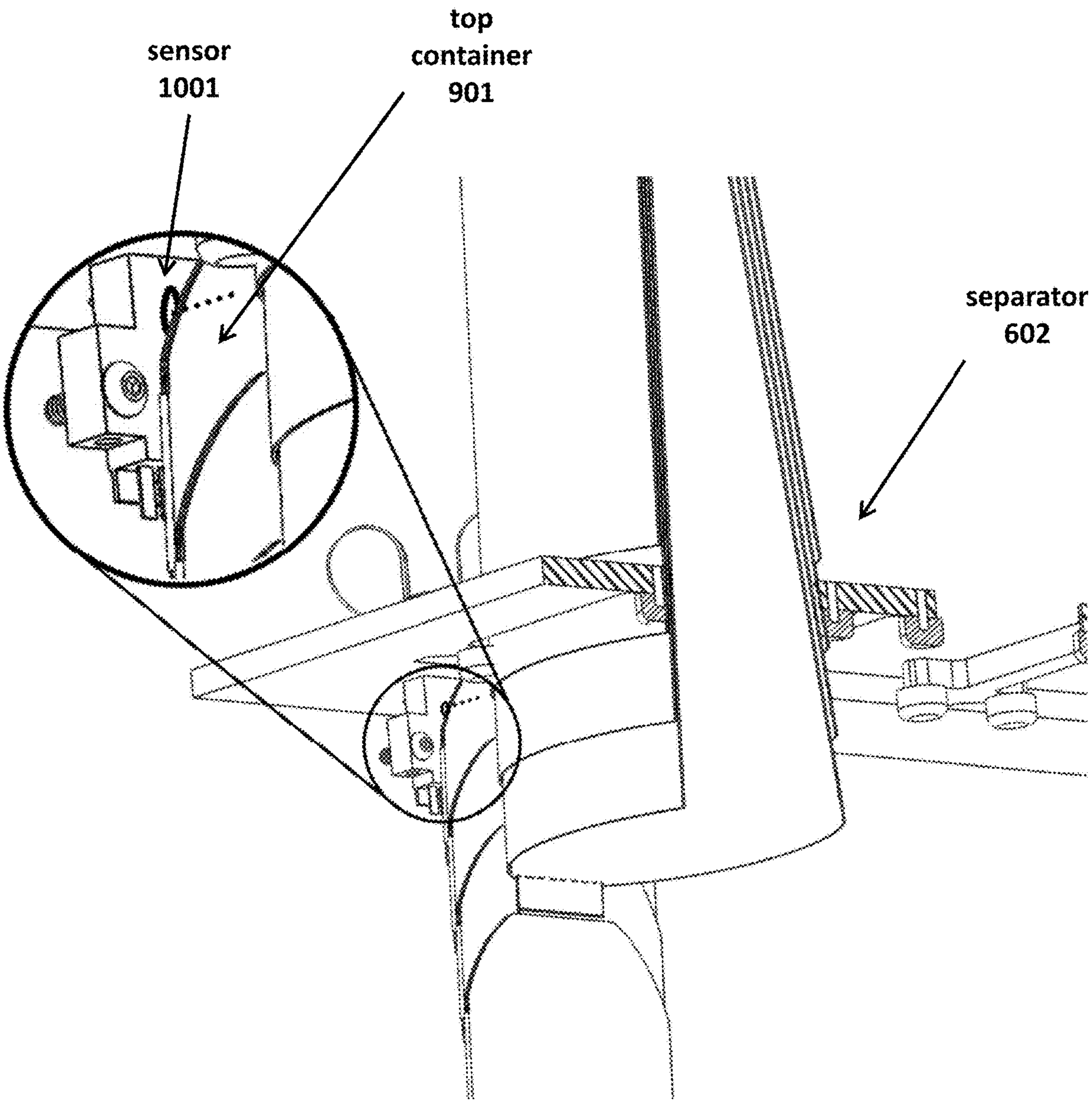
FIG. 10 depicts a sensor in the separator.

FIGS. 8-10 depict additional detail regarding separator 602.

FIG. 8 depicts a top view of separator 602. Separator 602 comprises a plurality of apertures 801, with each aperture 801 properly sized to receive a stack 704 of containers 100, such that container 100 can fit through aperture 801 when pushed by lift plate 603.

In FIG. 9, a plurality of containers 100 at the top of a stack 704 is depicted, with the containers protruding through an aperture 801. Here, top container 901 is the top-most container 100, and second-to-top container 902 is immediately below top container 901. Separator 602 comprises a plurality of friction members 903 that are placed in the inner perimeter of each aperture 801. Friction members 903 are constructed with a material with a sufficient coefficient of friction to stop second-to-top container 902 from being pulled above separator 602 when gripper 601 grabs top container 901. That is, when gripper 601 removes top container 901 from stack 704, friction members 903 will prevent second-to-top container 902 from also being removed from separator 602. In a preferred embodiment, friction members 903 are constructed from rubber.

FIG. 10 depicts a close-up of a portion of separator 602 that includes sensor 1001. Sensor 1001 in this embodiment is an infrared (IR) sensor that is placed in a position such that sensor 1001 will be covered by the bottom flap of top container 901 when top container 901 is protruding through an aperture 801 at the desired height. When the bottom flap covers sensor 1001, controller 604 will receive an electrical signal indicating that sensor 1001 is covered, and controller 604 then will stop linear actuator 702 such that linear actuator 702 stops lifting lift plate 603.

FIGS. 11-18 depict additional detail regarding gripper 601.

Figure 11:
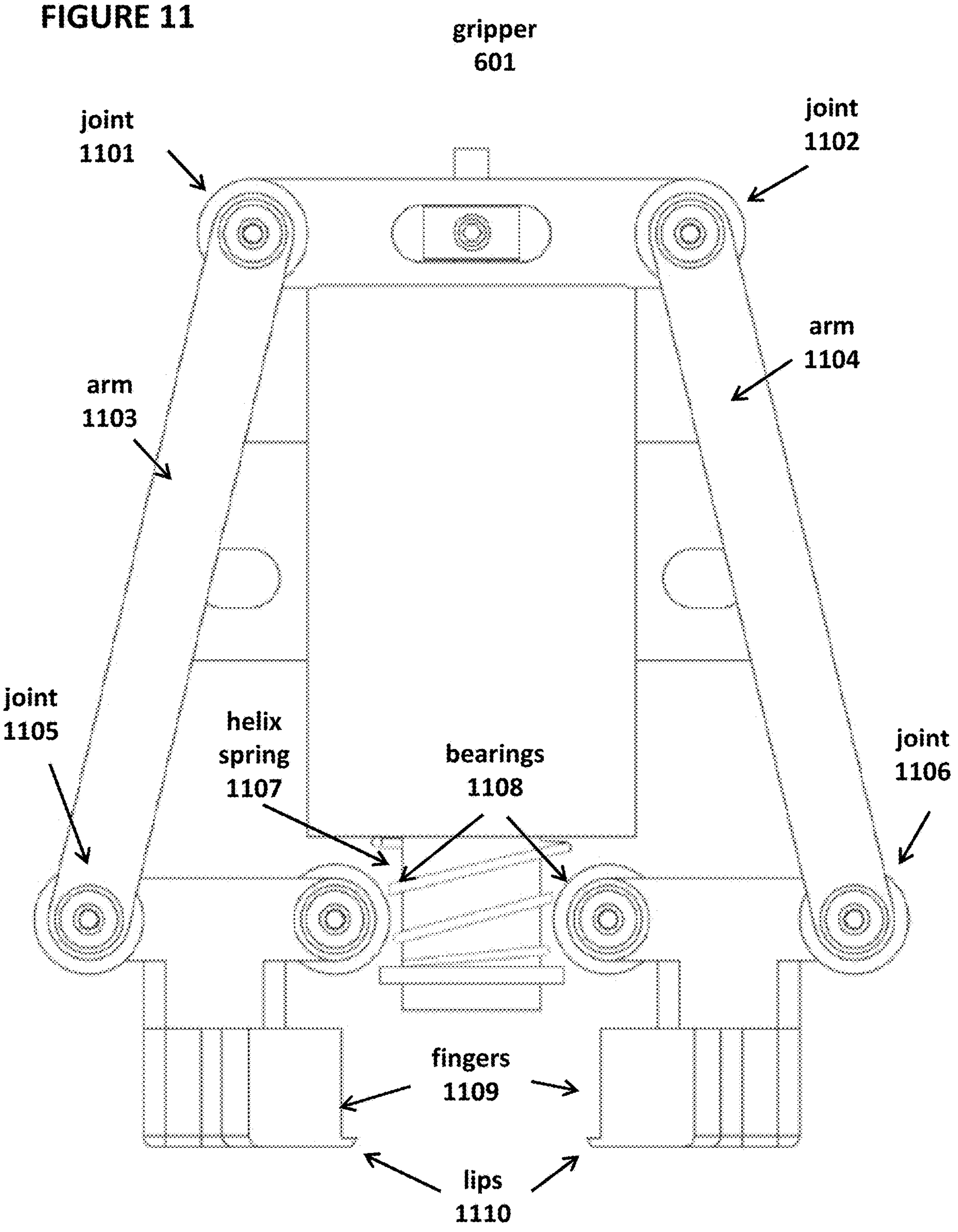
FIG. 11 depicts a front view of a gripper of the liquid dispensing device.

FIG. 11 depicts a front view of gripper 601. Gripper 601 comprises joints 1101 and 1102, arms 1103 and 1104, joints 1105 and 1106, helix spring 1107, bearings 1108, fingers 1109, and lips 1110, configured as shown.

Figure 12:
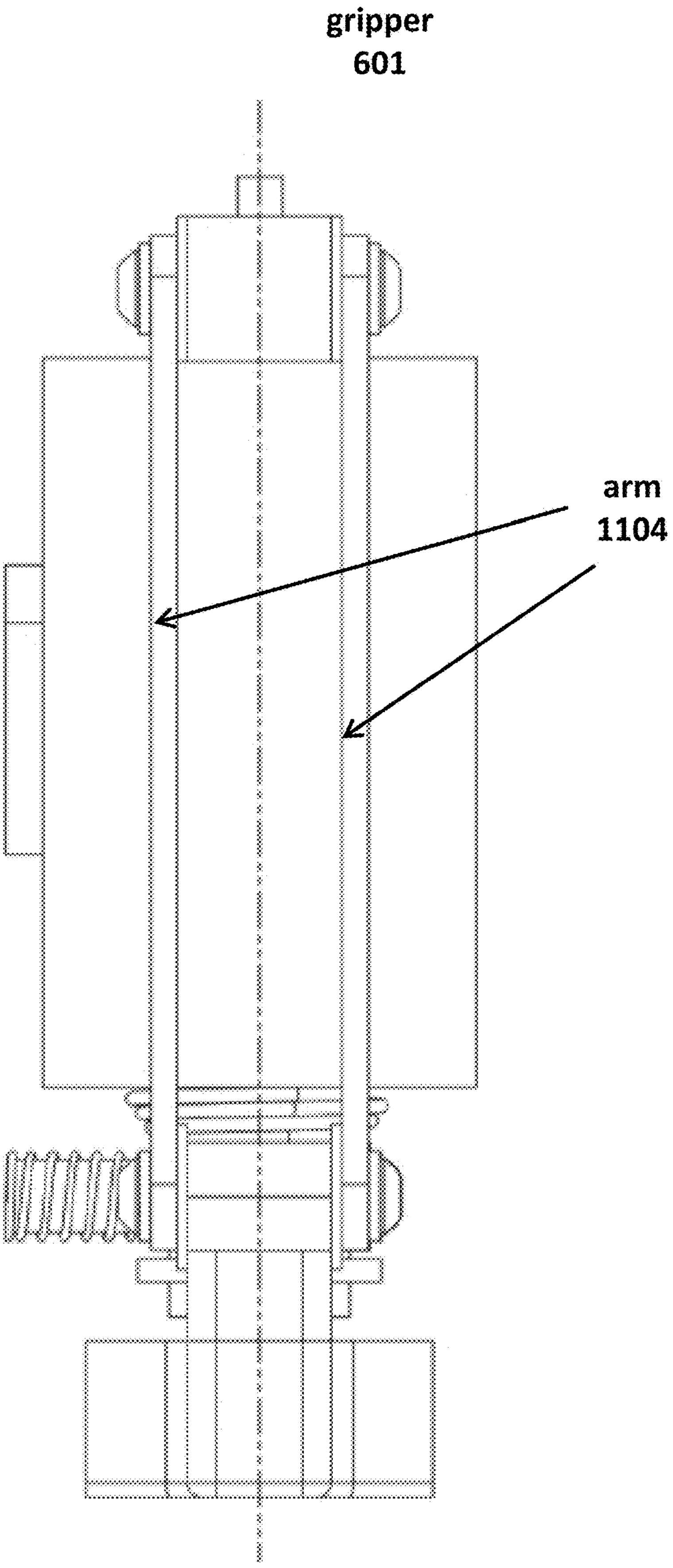
FIG. 12 depicts a side view of the gripper.

FIG. 12 depicts a side view of gripper 601. In this view, the side of arm 1104 is shown.

Figure 13:
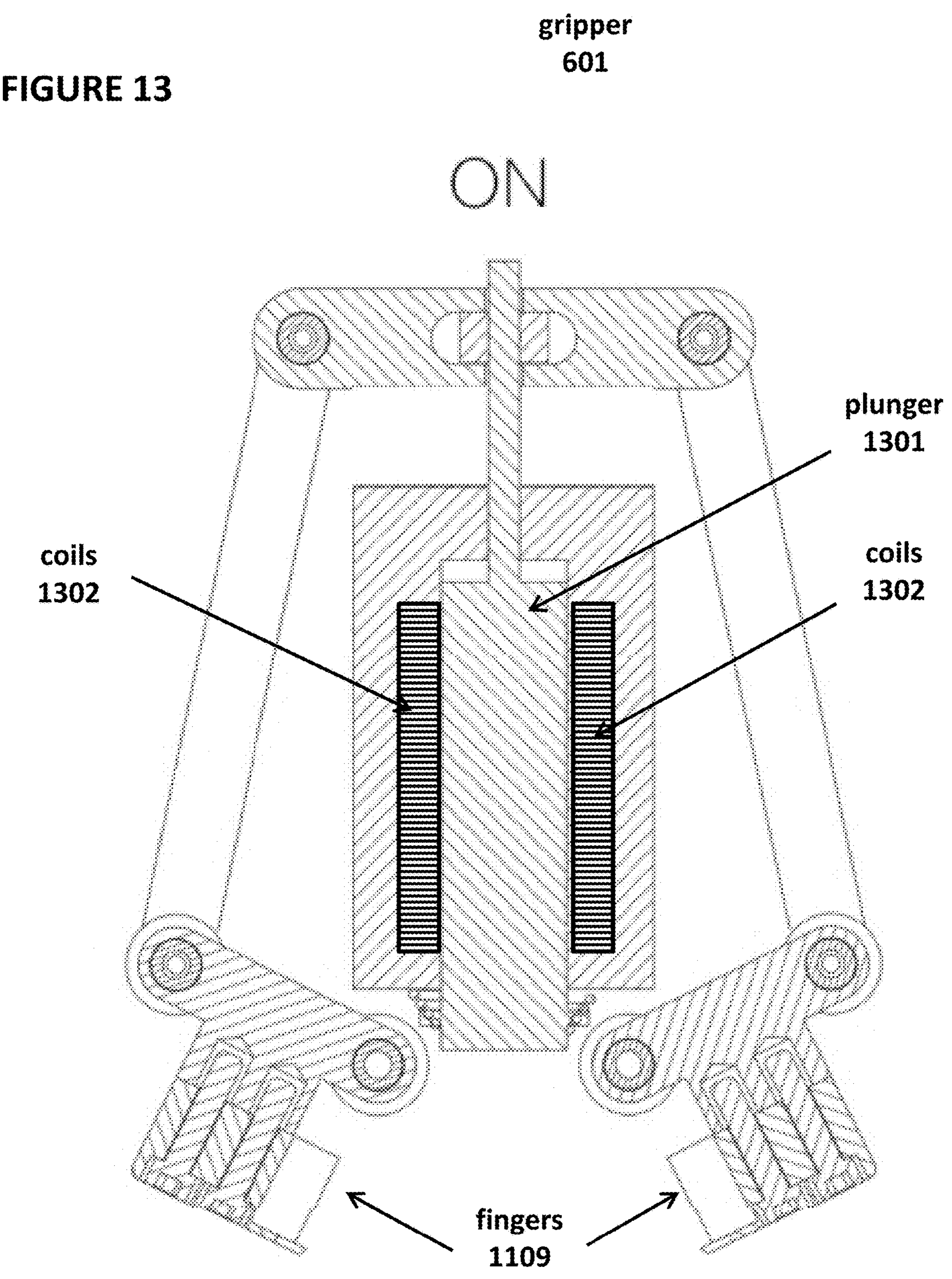
FIG. 13 depicts a front view of the gripper in an "on" state.

FIG. 13 depicts an "on" state of gripper 601. Gripper 601 comprises plunger 1301, which is made of metal, and interacts with the coils 1302 of a solenoid. The solenoid is electrically controlled by controller 604. When controller 604 turns the solenoid on, current will run through the solenoid, a magnetic field will be generated around solenoid, and plunger 1301 will be pulled upward as a result of the magnetic force. This movement causes fingers 1109 to jut outward as bearings 1108 pivot.

Figure 14:
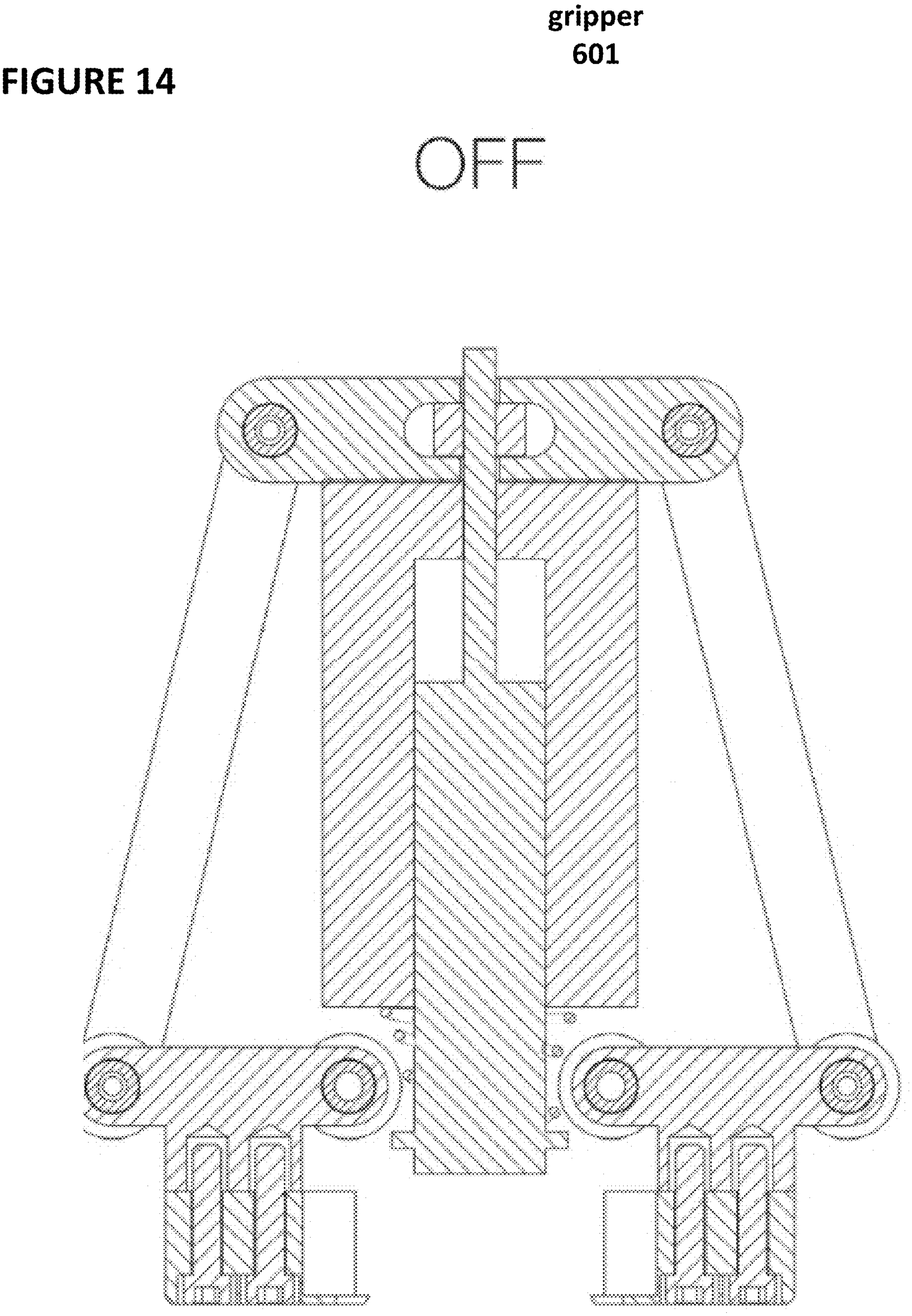
FIG. 14 depicts a front view of the gripper in an "off" state.

FIG. 14 depicts an "off" state of gripper 601. When controller 604 turns the solenoid off, the magnetic field will cease being generated around the solenoid, and plunger 1301 will fall downward due to its own weight, with additional force being provided by spring helix 1107. Fingers 1109 then will move inward as the top of the supporting structure eases downward.

Figure 15:
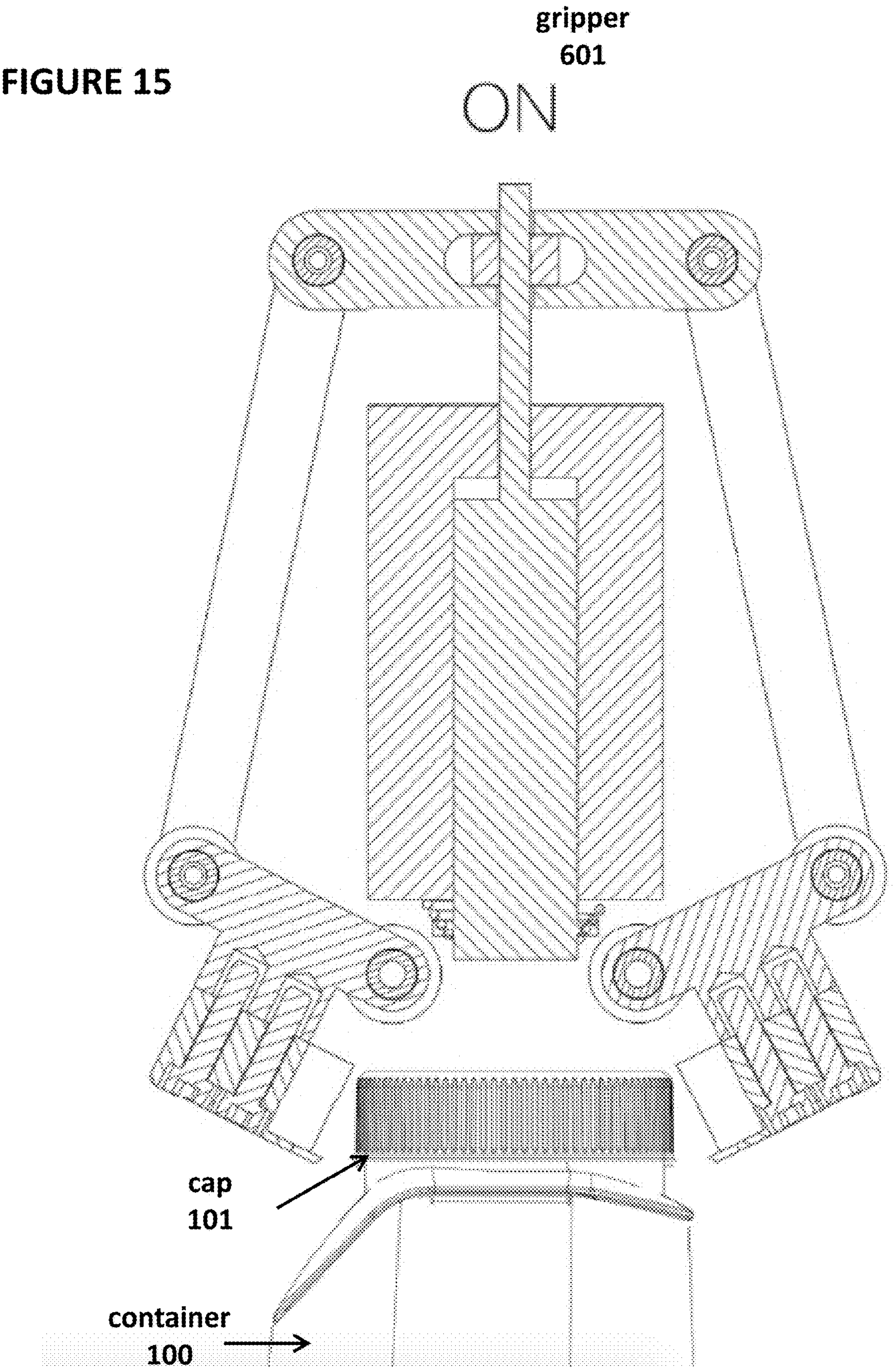
FIG. 15 depicts a front view of the gripper in an "on" state with a container.

FIG. 15 depicts an "on" state of gripper 601, this time in proximity to container 100. This is the configuration immediately before gripper 601 grabs a container 100 from above separator 602. Here, fingers 1109 have moved outward and can receive cap 101.

Figure 16:
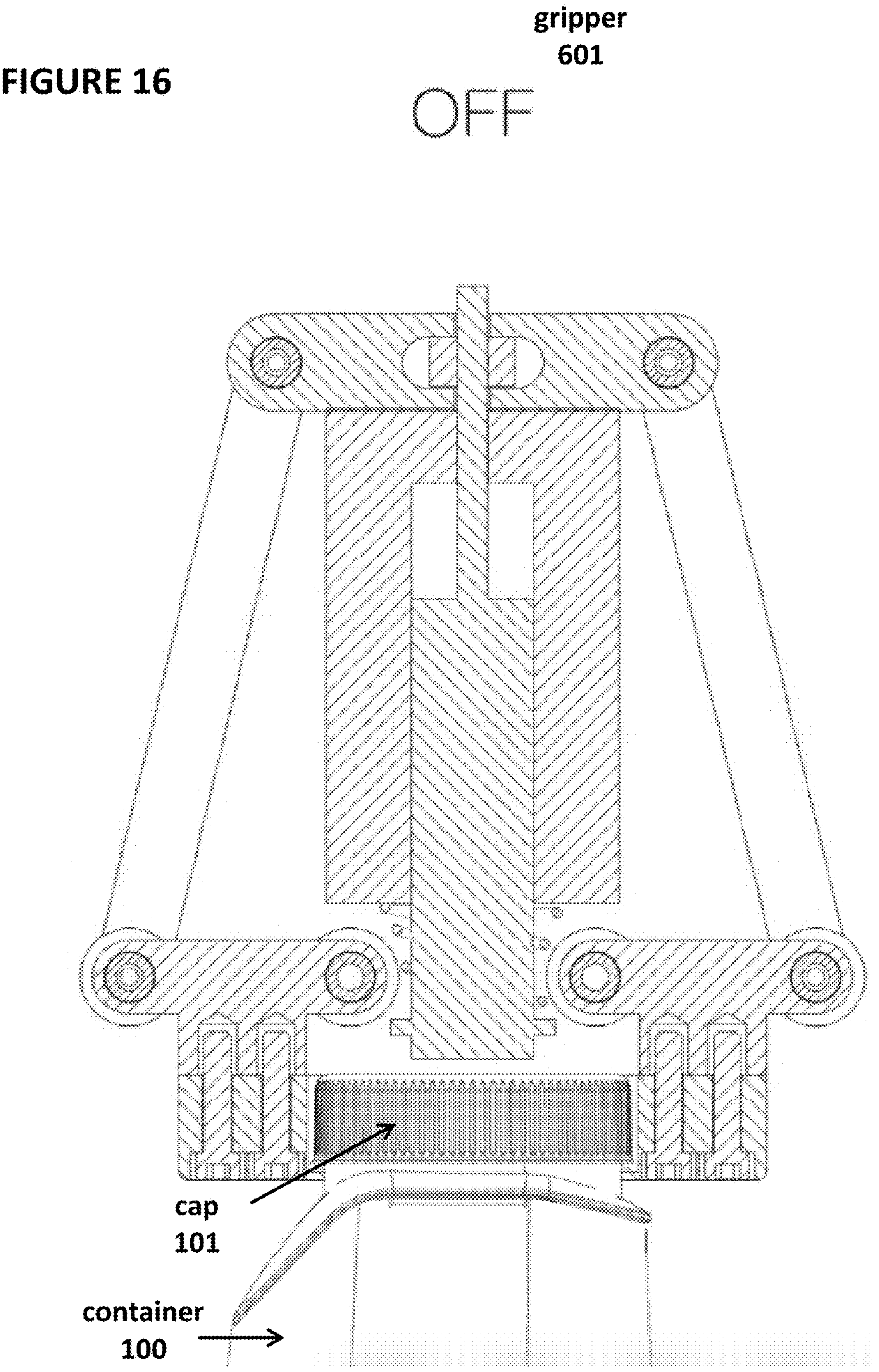
FIG. 16 depicts a front view of the gripper in an "off" state with a grabbed container.

FIG. 16 depicts an "off" state of gripper 601. Gripper 601 has moved downward in the vertical direction, such that cap 101 is located between fingers 1109. When gripper 601 is turned off, fingers 1109 move inward, and lips 1110 are pushed inward under cap 101. In this manner, gripper 601 is able to grab container 100. One aspect of gripper 601 that is novel is that the force that is exerted downward by container 100 causes fingers 1109 to press inward with greater force and therefore to exert a more forceful grab of container 100. That is, unlike in prior art devices, the grip exerted by gripper 601 increases as the weight of container 100 increases, due to the relative location of joints 1105 and 1106.

Figure 17A:
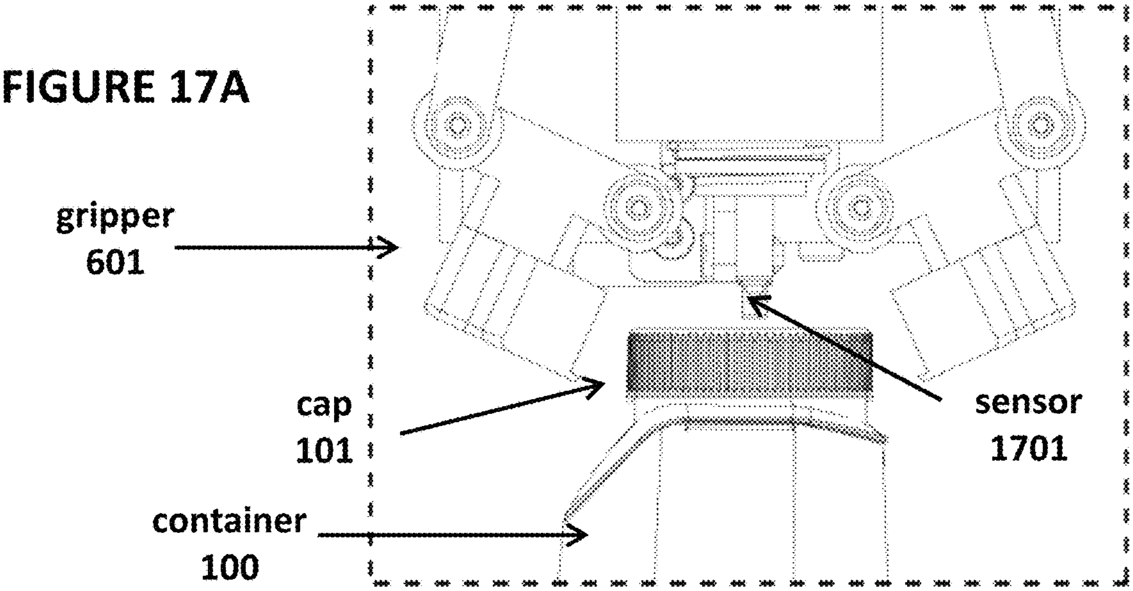
FIGS. 17A, 17B, and 17C depict a sequence of the gripper grabbing the cap of a container.
Figure 17B:
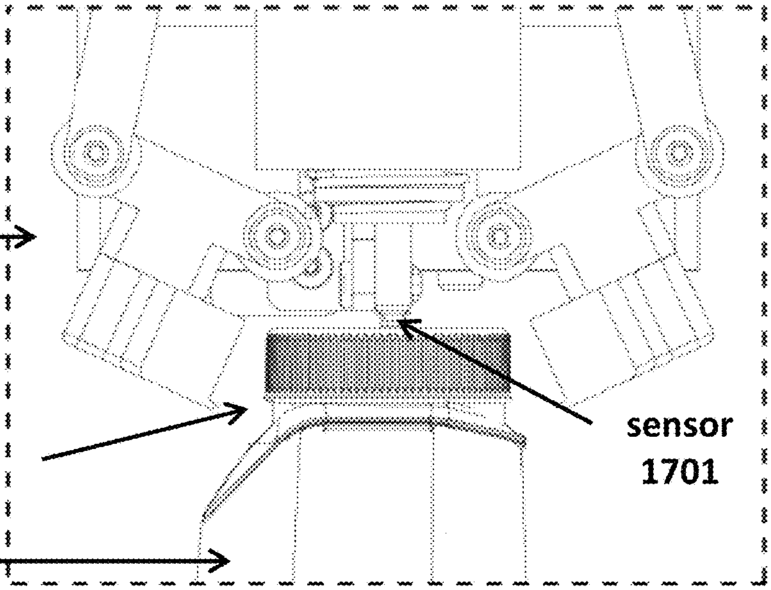
Figure 17C:
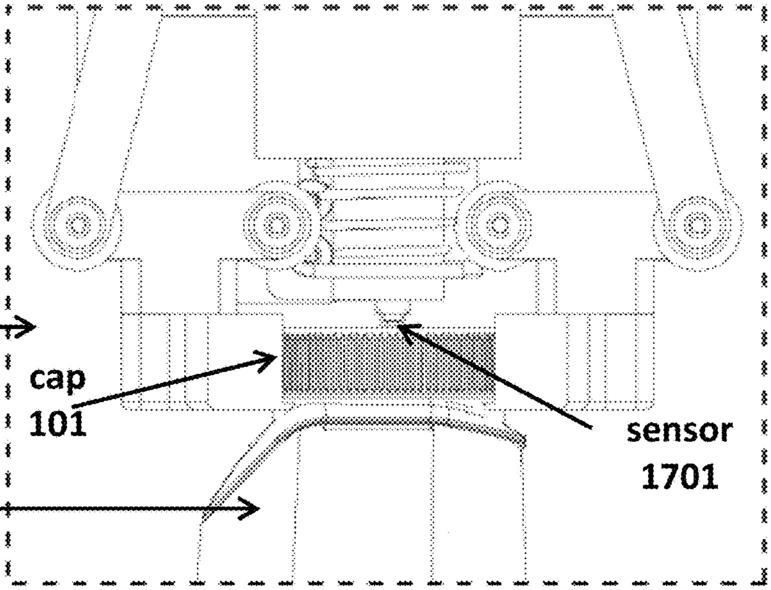

FIGS. 17A, 17B, and 17C depict the sequence by which gripper 601 begins in the "on" state, surrounds cap 101, and then proceeds to an "off" state whereby it grabs cap 101 and container 100. Optionally, sensor 1701 can be used as a switch to activate gripper 601 once gripper 601 is in the proper vertical location vis a vis cap 101. When cap 101 pushes sensor 1701, controller 604 then can caused the solenoid to turn off, thereby causing gripper 601 to grab cap 101.

Figure 18:
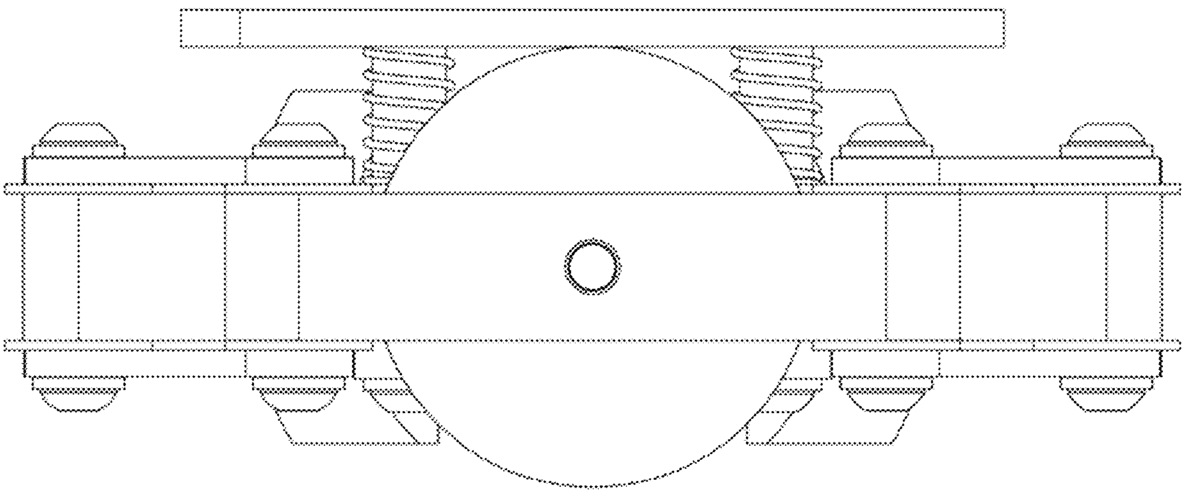
FIG. 18 depicts a top view of the gripper.

FIG. 18 depicts a top view of gripper 601.

Figure 19:
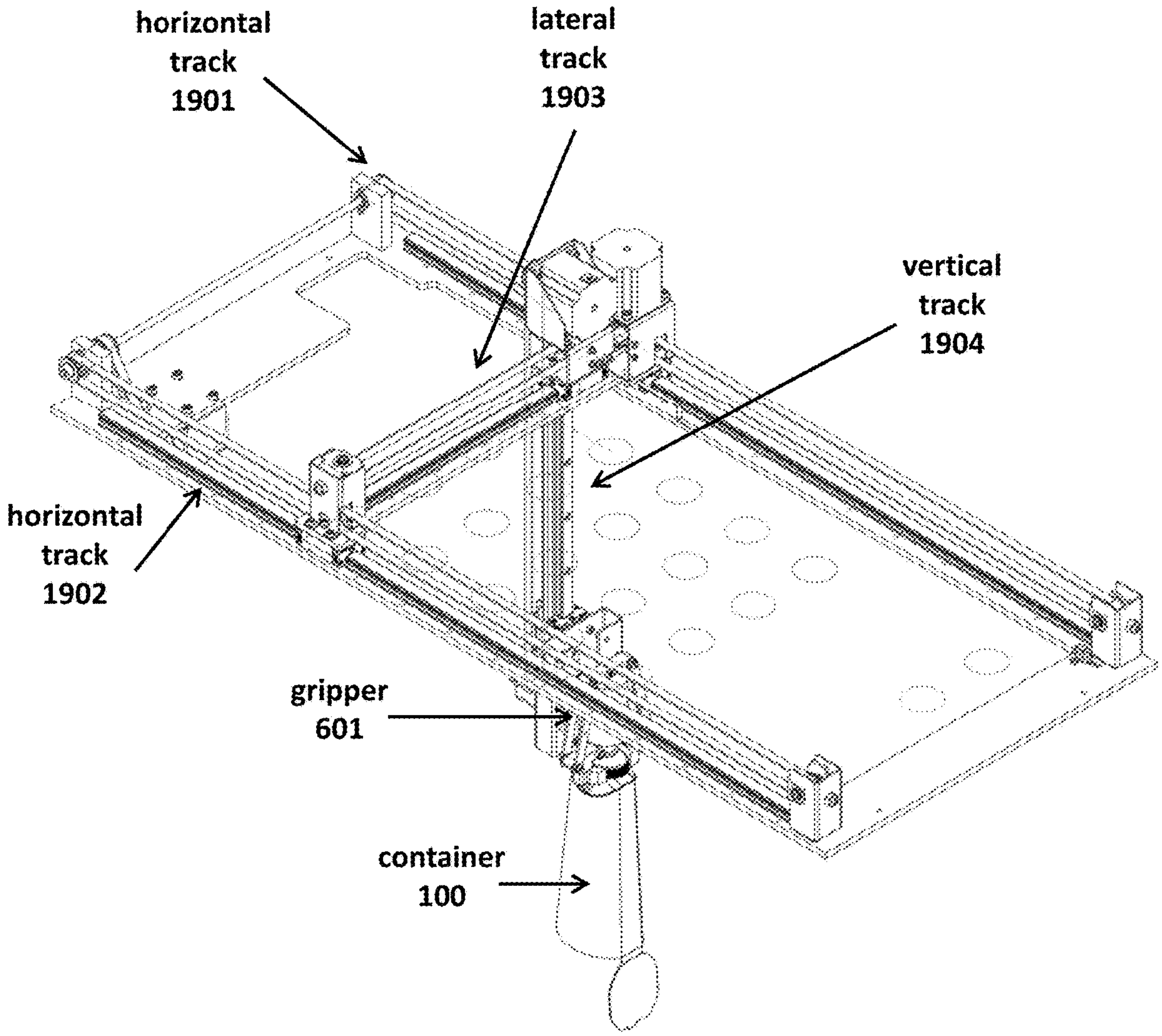
FIG. 19 depicts motorized tracks used to move the gripper.

FIG. 19 depicts various tracks along which gripper 601 can move. Specifically, gripper 601 moves in the horizontal direction along horizontal tracks 1901 and 1902 (either of which can be track 609 shown in FIG. 6), in the lateral direction along lateral track 1903, and vertically along vertical track 1904. This allows gripper 601 to be able to grab top container 901 from any stack 704 above any aperture 801 in separator 602, to move the container to bottom flap closer 610, and ultimately to dispense the container 100.

Figures 20A, 20B, 20C:
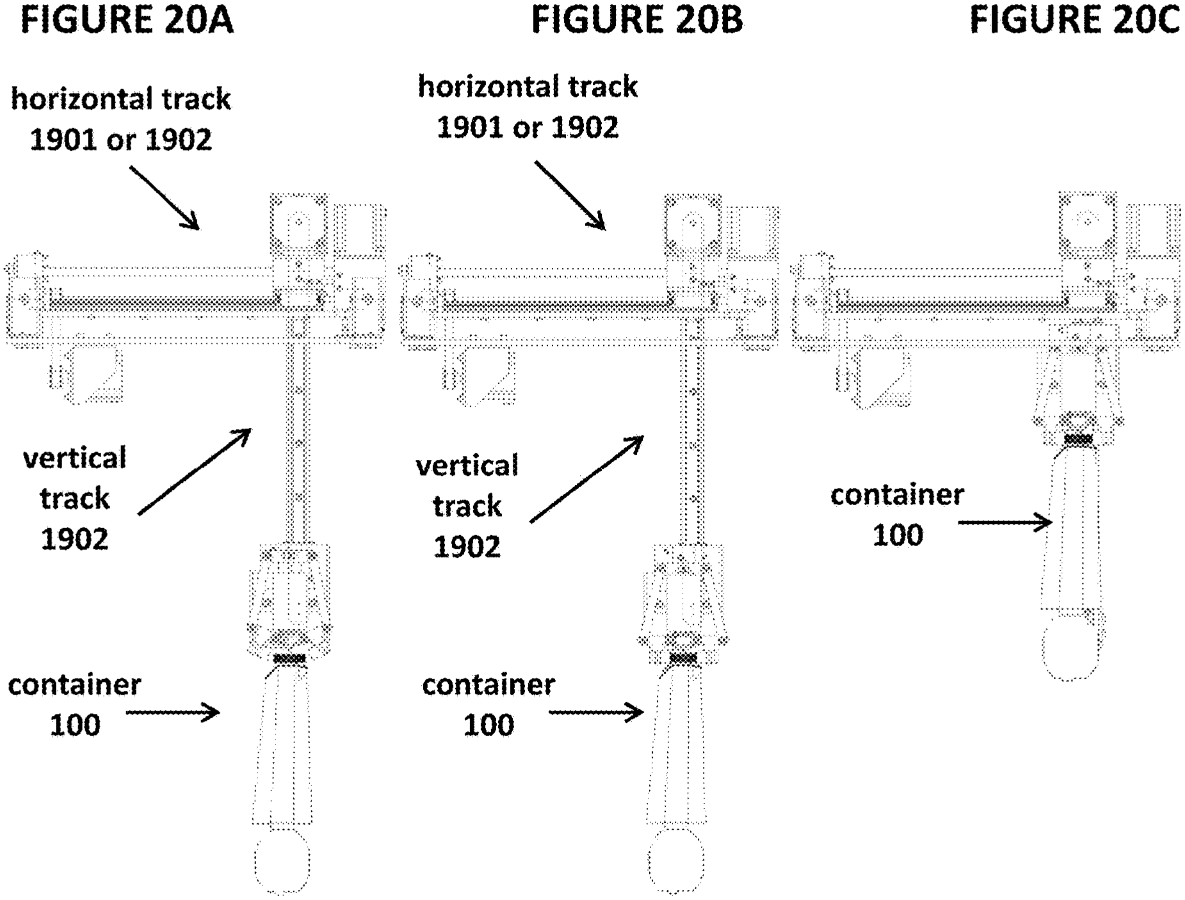
FIGS. 20A, 20B, and 20C depict additional views of tracks used to move the gripper.

FIGS. 20A, 20B, and 20C depict further views of horizontal tracks 1901 or 1902 and vertical track 1902.

As indicated previously, gripper 601 will grab a top container 901 from separator 602. Because lift plate 603 can hold a plurality of stacks 704 of containers 100, there typically will be a top container 901 in more than one stack at the same level. Controller 604 therefore runs an algorithm that keeps track of which top container 901 has been removed from which stack 704. This can be understood with reference again to FIG. 8. If there is a stack 704 inserted into each of the apertures 801, controller 604 can simply ensure that it grabs the top container 901 from each stack 704, for example, by first starting in the top row, left column, and then working toward the right until the top container 901 has been removed from each aperture 801 in the top row. It then can grab the top container 901 from the next row, left column, and so forth. Once all top containers 901 have been removed, controller 604 will cause linear actuator 702 to move lift plate 603 upward until sensor 1001 is covered.

Figure 21A:
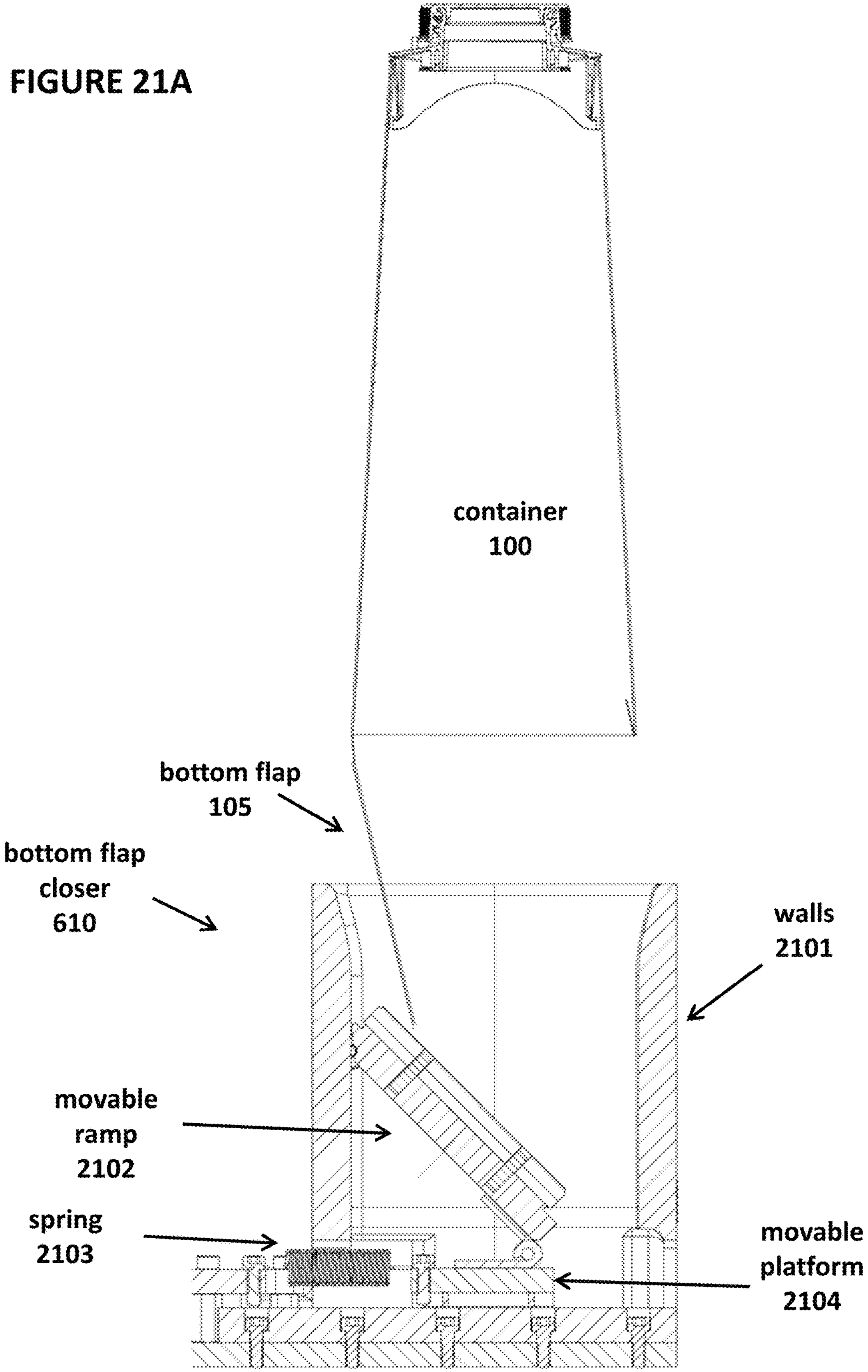
FIGS. 21A, 21B, and 21C depict a sequence of a bottom flap closer of the liquid dispensing device used to close the bottom flap of a container.
Figure 21B:
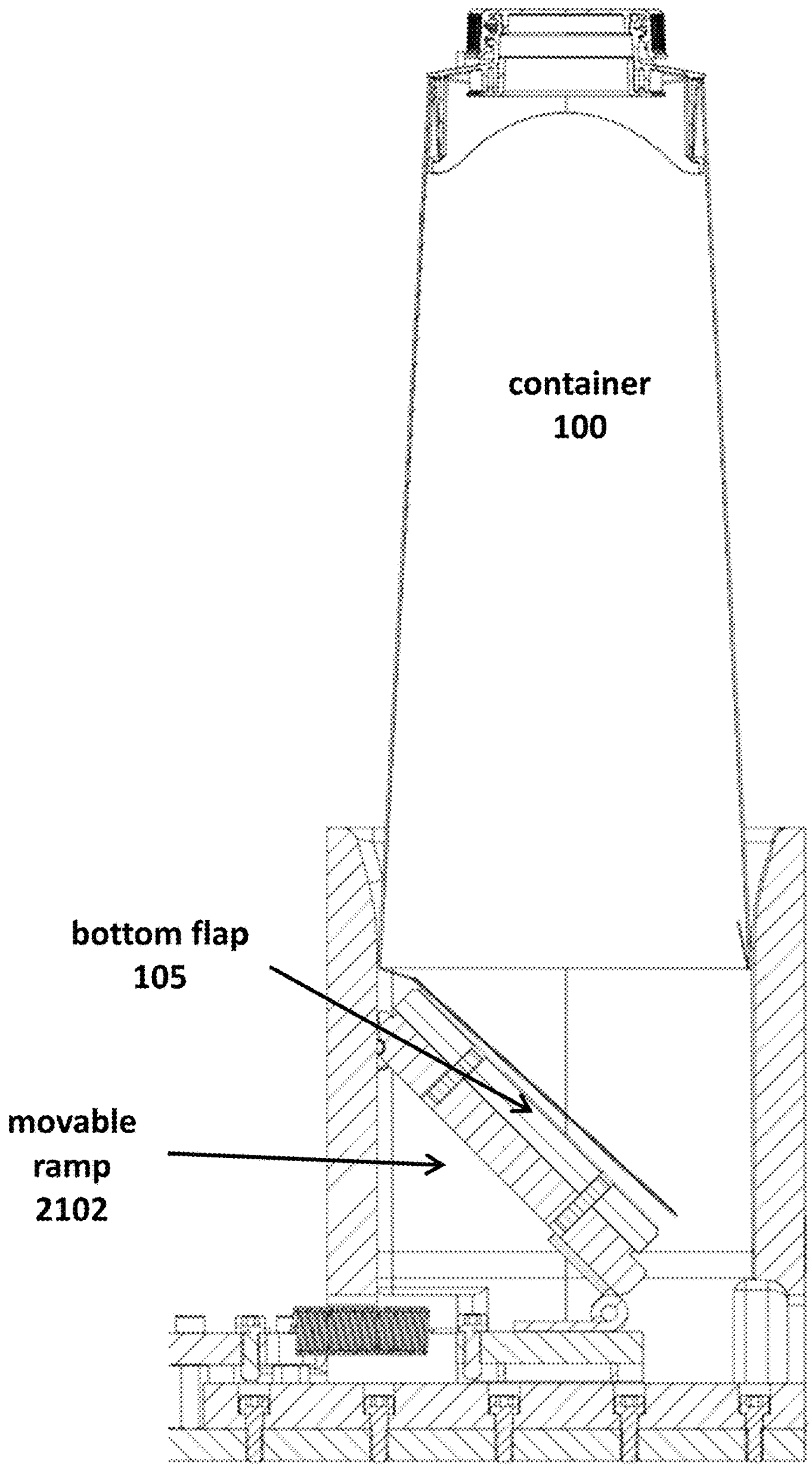
Figure 21C:
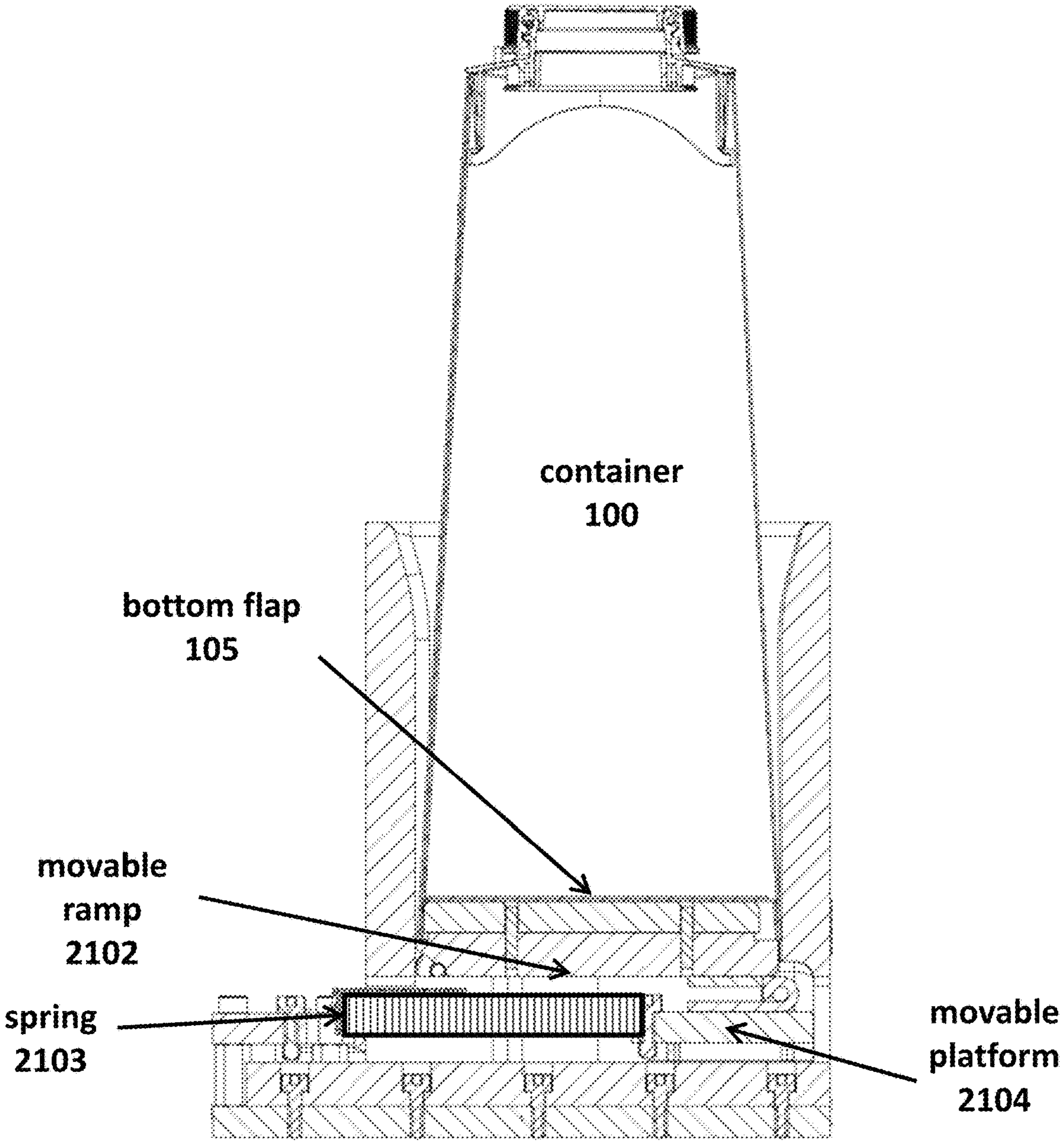

FIGS. 21A-21C depict additional detail regarding bottom flap closer 610.

In FIG. 21A, gripper 601 begins to place container 100 in bottom flap closer 610. Walls 2101 are sized to receive container 100. It can be seen that bottom flap 105 is extended above movable ramp 2102. Movable ramp 2102 is suspended on movable platform 2104, which in turn is connected to spring 2103.

In FIG. 21B, gripper 601 pushes container 100 further downward in bottom flap closer 610. Bottom flap 105 engages with movable ramp 2102.

In FIG. 21C, gripper 601 pushes container 100 further downward such that bottom flap 105 is secured in the desired position. It can be seen that movable ramp 2102 is now in a fully horizontal position and that movable platform 2104 has moved toward the right, extending spring 2103 in the process. The tension in spring 2103 as this occurs causes movable ramp 2102 to exert force on bottom flap 105, pushing it upward into the desired position.

FIGS. 22-25 depict additional information regarding capper/decapper 606.

Figure 22:
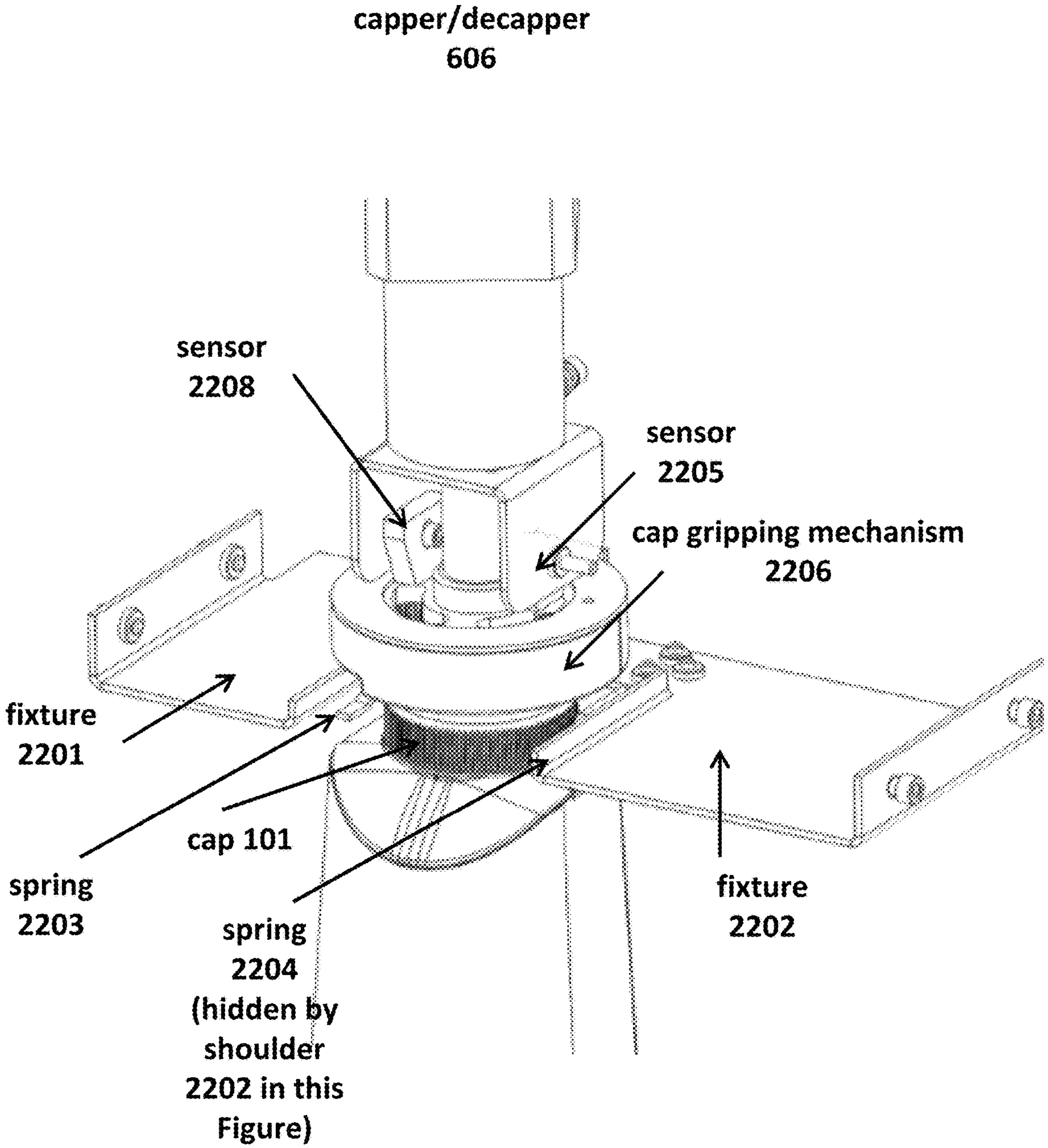
FIG. 22 depicts a side view of a capper/decapper of the liquid dispensing device.

In FIG. 22, a front view of capper/decapper 606 is depicted. Capper/decapper 606 comprises fixtures 2201 and 2202, springs 2203 and 2204, sensors 2205 and 2208, cap gripping mechanism 2206, and spindle motor 2207. Fixtures 2201 and 2202 are sized to be able to receive container 100 and cap 101. Springs 2203 and 2204 exert downward pressure on container 100 to assist in removing container 100 from capper/decapper 606 after the capping or decapping action is complete. Fixtures 2201 and 2202 provide some resistance to container 100 when cap 101 is screwed off and screwed on, which prevents container 100 from spinning along with cap 101 when rotational force is applied to cap 101.

Figure 23:
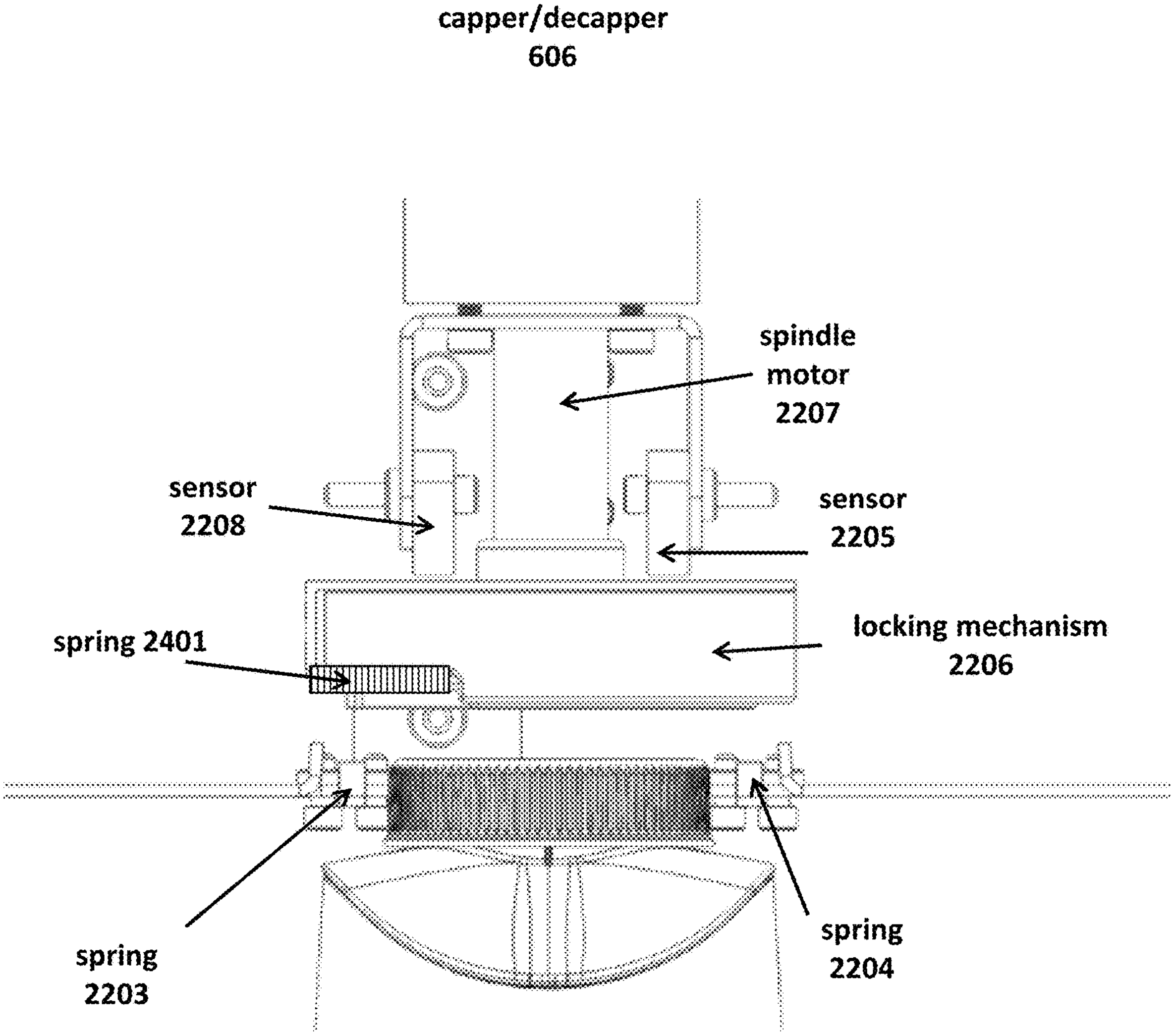
FIG. 23 depicts another side view of the capper/decapper.

FIG. 23 shows another front view of capper/decapper 606. Cap gripping mechanism 2206, springs 2203 and 2204, sensors 2205 and 2208, and spring 2401 are depicted.

Figure 24A:
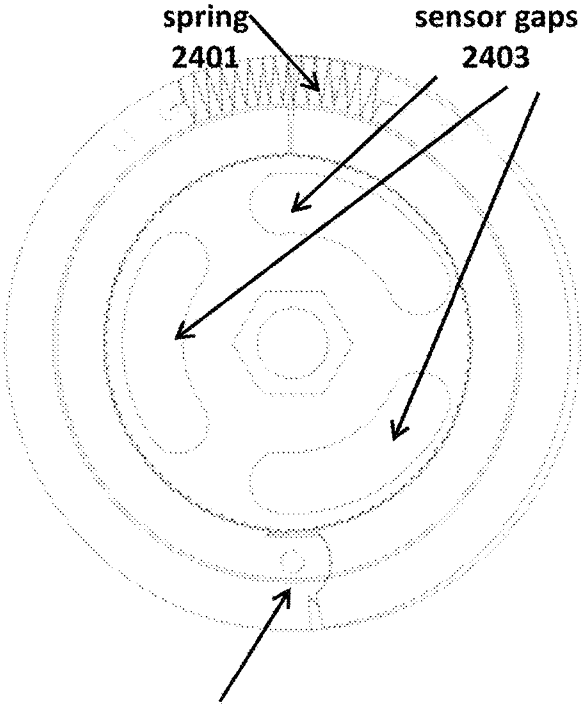
FIGS. 24A and 24B depict a bottom view and FIG. 24C depicts a side view of a mechanism in the capper/decapper for grabbing the cap.
Figure 24B:
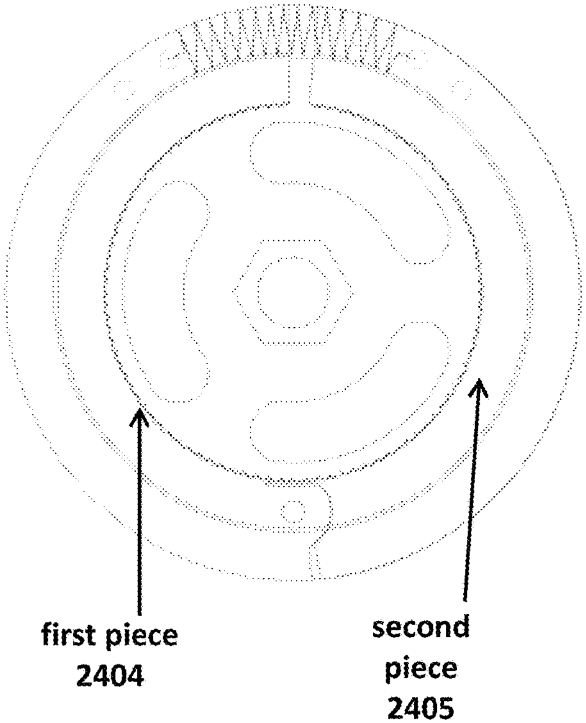
Figure 24C:
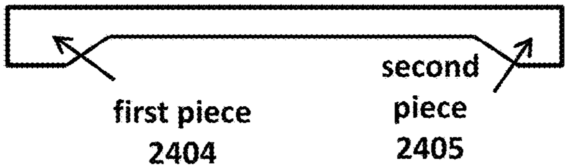

FIGS. 24A, 24B, and 24C provide additional detail regarding locking mechanism 2206. With reference to FIG. 24A, locking mechanism 2206 comprises spring 2401, hinge 2402, and sensor gaps 2403. FIG. 24A depicts locking mechanism 2206 when no cap 101 is contained within it. FIG. 24B depicts locking mechanism 2206 when cap 101 is contained within it (although cap 101 is not shown). When cap 101 is pushed into locking mechanism 2206, first piece 2404 and second piece 2405 rotate outward along hinge 2402, and spring 2401 expands. Spring 2401 then exerts force pulling first piece 2404 and second piece 2404 inward to securely grab cap 101. Once locking mechanism 2206 is holding cap 101, spindle motor 2207 can unscrew cap 101 from the remainder of container 100 and later can screw cap 101 back onto container 100. FIG. 24C depicts a side-view of locking mechanism 2206. First piece 2404 and second piece 2405 are tapered to receive cap 101.

Figure 25C:
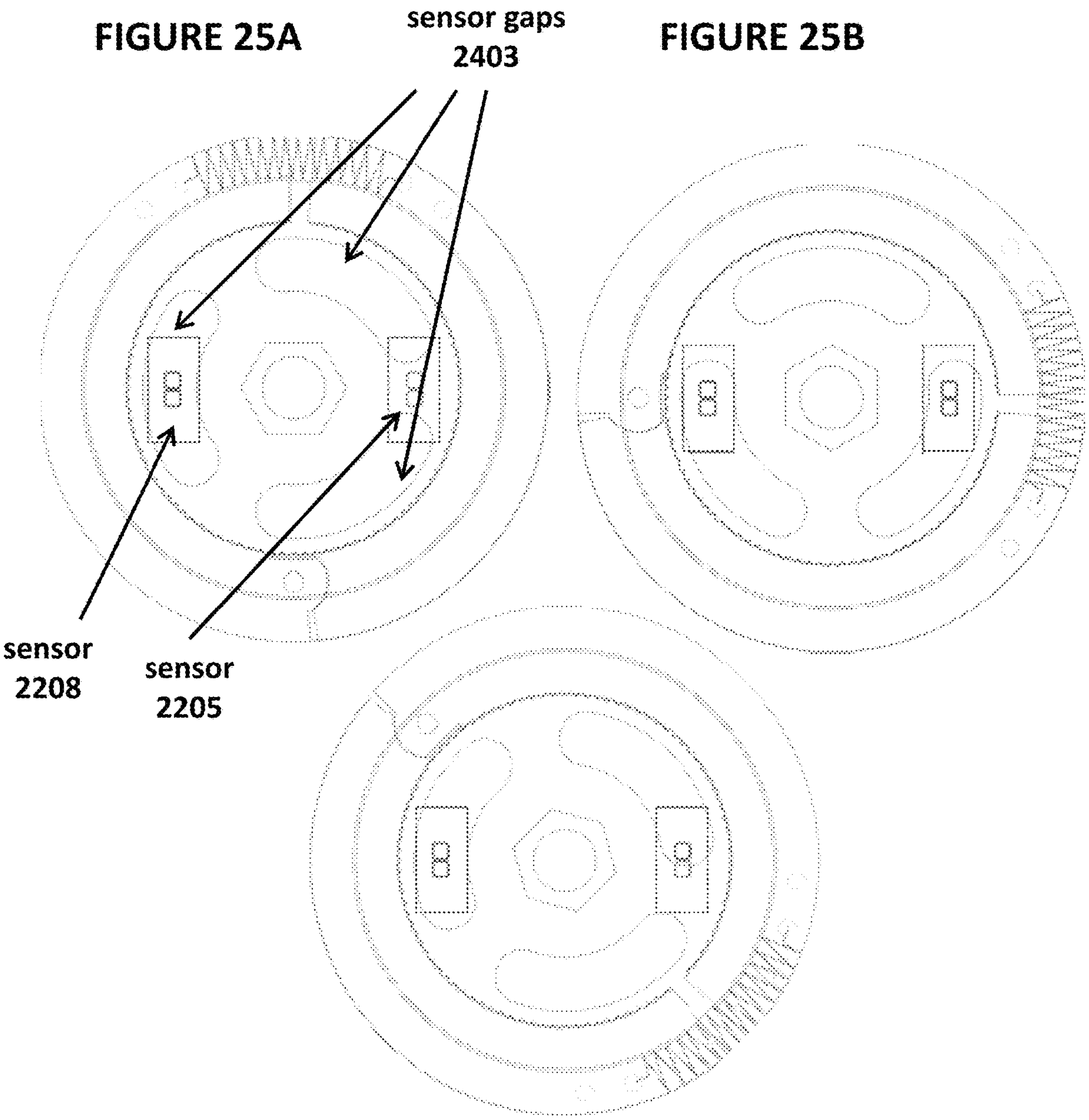

FIGS. 25A, 25B, and 25C depict sensors 2205 and 2208 relative to sensor gaps 2403. As can be seen, regardless of the orientation of locking mechanism 2206, one or both of sensors 2205 and 2208 will have a line of sight through one of the sensor gaps 2403. Sensors 2205 and 2208 therefore can be used to detect whether a cap 101 is present in locking mechanism 2206 or not because cap 101 will block sensors 2205 and 2208 if present. Specifically, the following logic is applied to determine whether cap 101 is present or not: (1) If sensors 2205 and 2208 are both not blocked, then no cap 101 is present; (2) If either sensor 2205 or sensor 2208 is blocked, then no cap 101 is present; and (3) If both sensors 2205 and 2208 are blocked, then cap 101 is present. Controller 604 therefore can use the output of sensors 2205 and 2208 to determine if a cap 101 is contained within locking mechanism 2206 or not.

Figure 26:
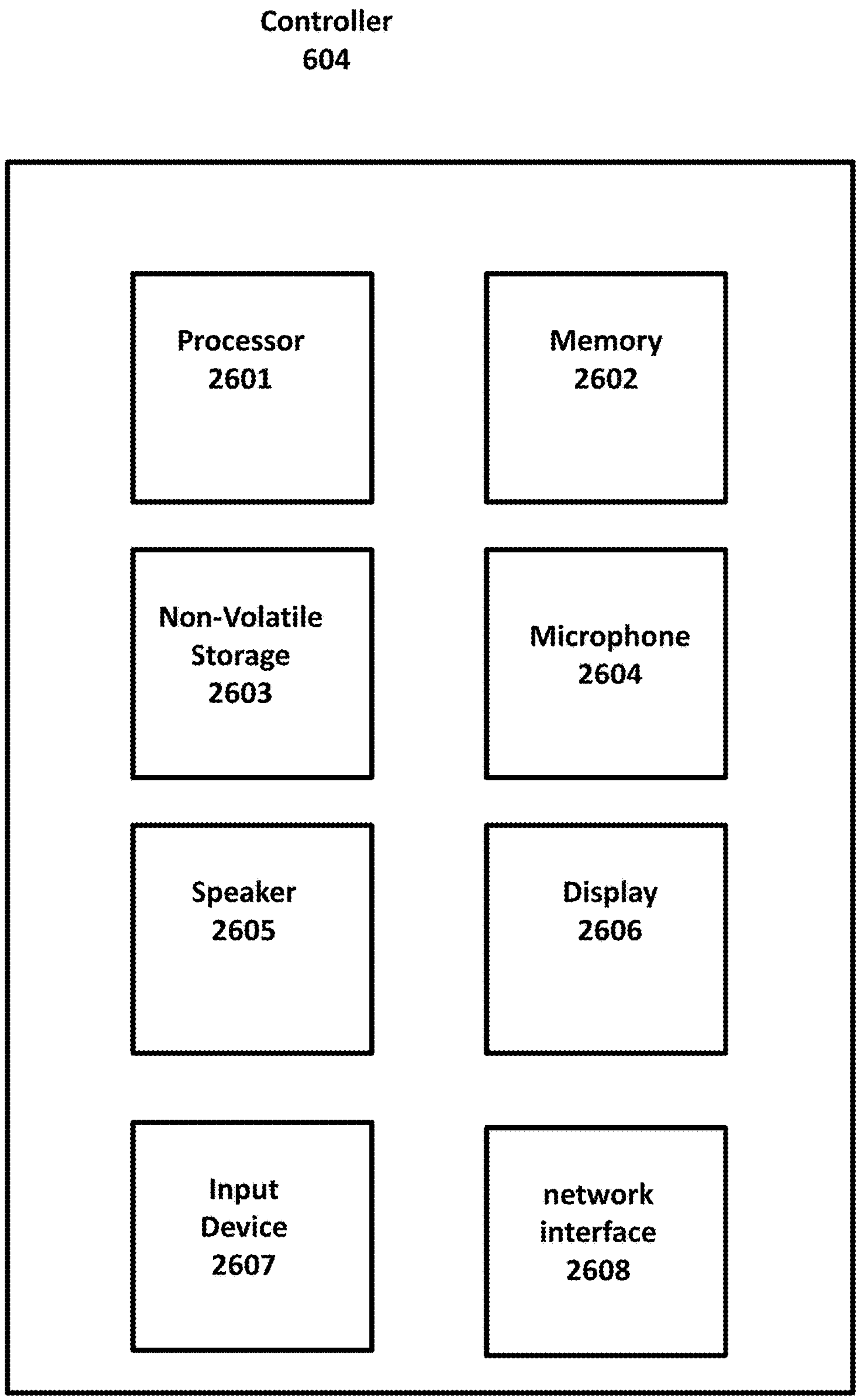
FIG. 26 depicts hardware aspects of a controller of the liquid dispensing device.
Figure 27:
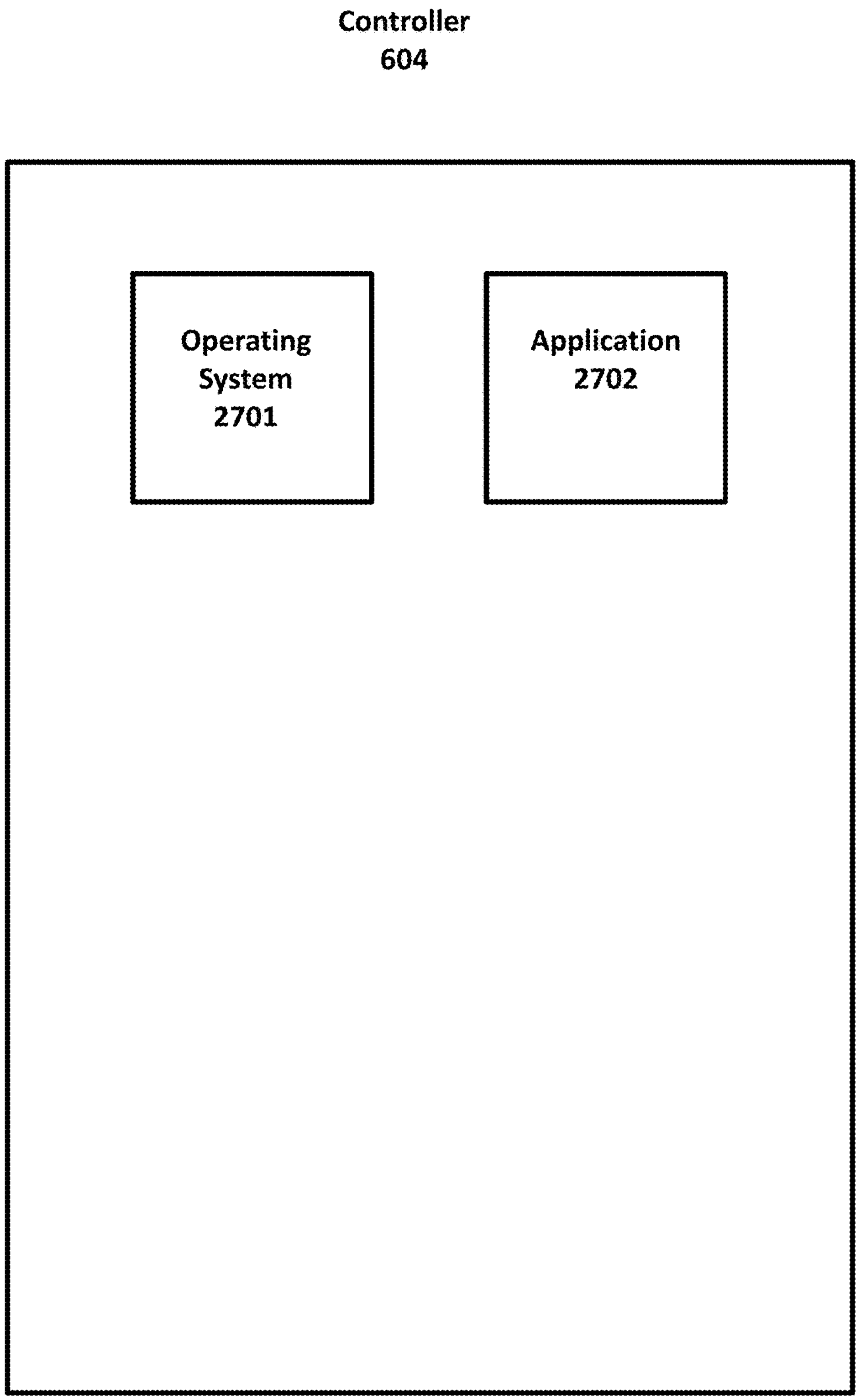
FIG. 27 depicts software aspects of the controller.

FIGS. 26-27 depict additional detail regarding controller 604.

FIG. 26 depicts hardware components of controller 604. Controller 604 comprises processor 2601, memory 2602, non-volatile storage 2603, microphone 2604, speaker 2605, display 2606, input device 2607, and network interface 2608. Non-volatile storage 2603 optionally is a hard disk drive or flash memory array. Display 2606 optionally is a touchscreen display capable of receiving commands from a user. Network interface 2608 can be a wired (e.g., Ethernet) or wireless (e.g., WiFi, Bluetooth, 3G, 4G, GSM, etc.) One or more of microphone 2604, speaker 2605, display 2606, input device 2607, and network interface 2608 can be used to interact with a user and can, for example, receive a command from a user for one or more filled containers and can facilitate payment for the one or more filled containers, as in the embodiment of kiosk 1.

FIG. 27 depicts software components of controller 604. Controller 604 comprises operating system 2701 (such as the operating systems known by the trademarks “Android” or “iOS”) and application 2702. Application 2702 comprises lines of code to perform the control functions disclosed herein (e.g., stopping linear actuator 702 when sensor 1001 detects an object). Application 2702 optionally can operate a state machine for controlling the functions of liquid dispensing device 600.

While the invention has been described above by reference to various embodiments, it will be understood that changes and modifications may be made without departing from the scope of the invention, which is to be defined only by the appended claims and their equivalents.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A method for dispensing a filled container, comprising:

removing a single container from a stack of containers within a chassis, the single container and the containers in the stack of containers each comprising a shell surrounding a bag, wherein the shells of the containers in the stack of containers are nested;

filling the bag with filtered water within the chassis;

sealing the bag within the chassis; and dispensing the single container from the chassis.

2. The method of claim 1, wherein the sealing comprises securing a cap on the single container.

3. The method of claim 1, comprising:

filtering water from a source external to the chassis to generate the filtered water.

4. The method of claim 1, comprising:

facilitating payment before the dispensing.

5. The method of claim 1, wherein the containers in the stack of containers are formed of compostable materials.

6. The method of claim 1, comprising:

chilling the filtered water.

7. The method of claim 1, comprising:

adding an additive to the filtered water in the bag.

8. The method of claim 7, wherein the additive comprises caffeine.

9. The method of claim 7, wherein the additive comprises a flavor.

10. The method of claim 7, wherein the additive comprises a health supplement.

11. A system for dispensing a filled container, comprising:

a chassis;

a stack of containers within the chassis, each container in the stack of containers comprising a shell surrounding a bag, wherein the shells of the containers in the stack of containers are nested; and an automated mechanism within the chassis to remove a single container comprising a shell surrounding a bag from the stack of containers, fill the bag with filtered water, seal the bag, and dispense the single container from the chassis.

12. The system of claim 11, wherein the automated mechanism performs the seal operation by securing a cap on the single container.

13. The system of claim 11, comprising:

a filtration system to filter water from a source external to the chassis to generate the filtered water.

14. The system of claim 11, comprising:

a payment system to facilitate payment from a user before dispensing the single container from the chassis.

15. The system of claim 11, wherein the containers in the stack of containers are formed of compostable materials.

16. The system of claim 11, comprising:

a chilling unit to chill the filtered water.

17. The system of claim 11, comprising:

a mechanism to add an additive to the filtered water in the single container.

18. The system of claim 17, wherein the additive comprises caffeine.

19. The system of claim 17, wherein the additive comprises a flavor.

20. The system of claim 17, wherein the additive comprises a health supplement.

* * * * *